(12) United States Patent
Mian et al.

(10) Patent No.: US 7,478,570 B2
(45) Date of Patent: Jan. 20, 2009

(54) WHEEL MEASUREMENT SYSTEMS AND METHODS

(75) Inventors: Zahid F. Mian, Loudonville, NY (US); Jeremy C. Mullaney, Troy, NY (US); Robert MacAllister, Mechanicville, NY (US); William Peabody, Saratoga Springs, NY (US)

(73) Assignee: International Electronic Machines Corp., Albany, NY (US)

( * ) Notice: Subject to any disclaimer, the term of this patent is extended or adjusted under 35 U.S.C. 154(b) by 0 days.

(21) Appl. No.: 11/536,137

(22) Filed: Sep. 28, 2006

(65) Prior Publication Data

US 2007/0075192 A1 Apr. 5, 2007

Related U.S. Application Data

(60) Provisional application No. 60/723,441, filed on Oct. 5, 2005.

(51) Int. Cl.
*G01N 19/00* (2006.01)
(52) U.S. Cl. .................................. 73/865.9
(58) Field of Classification Search .................. None
See application file for complete search history.

(56) References Cited

U.S. PATENT DOCUMENTS

| | | | |
|---|---|---|---|
| 4,538,357 A * | 9/1985 | Dressel et al. ............ 33/203.18 |
| 4,679,447 A * | 7/1987 | Sieradzki et al. ............ 73/865.8 |
| 4,904,939 A | 2/1990 | Mian |
| 5,636,026 A | 6/1997 | Mian et al. |
| 6,523,411 B1 | 2/2003 | Mian et al. |
| 6,788,551 B2 | 9/2004 | Takagi |
| 7,250,852 B1 * | 7/2007 | Kell ........................ 340/447 |
| 7,251,992 B2 * | 8/2007 | Petrucelli .................. 73/146 |
| 2005/0259273 A1 | 11/2005 | Mian et al. |
| 2005/0267707 A1 | 12/2005 | Mian et al. |

FOREIGN PATENT DOCUMENTS

| EP | 0007227 A1 | 1/1980 |
|---|---|---|
| GB | 2183840 A | 6/1987 |

* cited by examiner

*Primary Examiner*—Robert R Raevis
(74) *Attorney, Agent, or Firm*—Hoffman Warnick LLC

(57) ABSTRACT

An improved maintenance, inspection, and/or measurement solution is provided. An embodiment of the invention includes a handheld measurement device for measuring an object, such as a railway wheel on a train. The handheld measurement device can comprise a single unit to provide one handed operation and can include various features, such as onboard evaluation, a graphical user interface, and/or a self-health monitor. Additionally, aspects of the invention provide an inspection environment that incorporates preliminary measurement data, wireless communications, and/or historical data into the measurement and evaluation process.

10 Claims, 15 Drawing Sheets

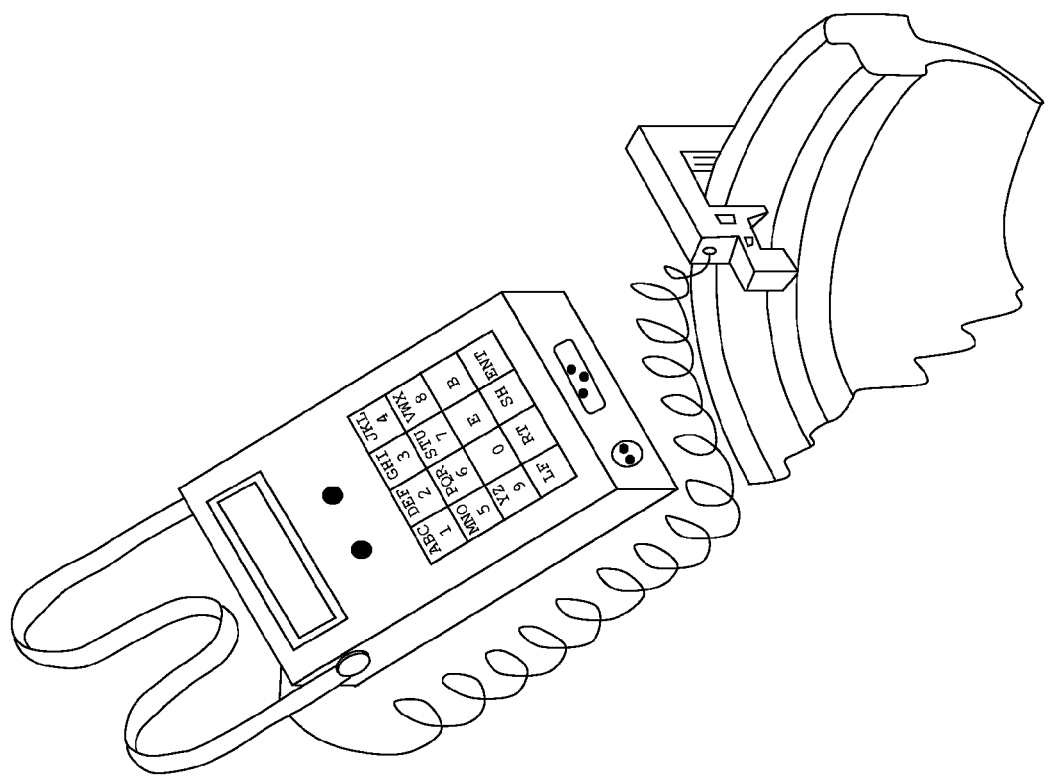

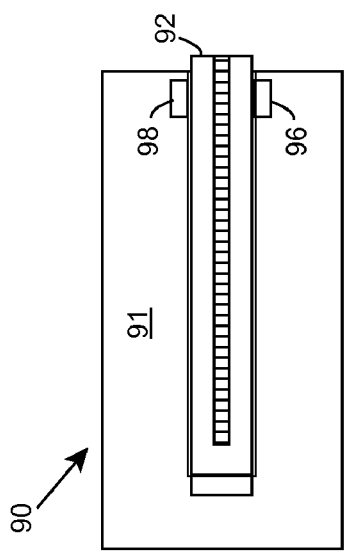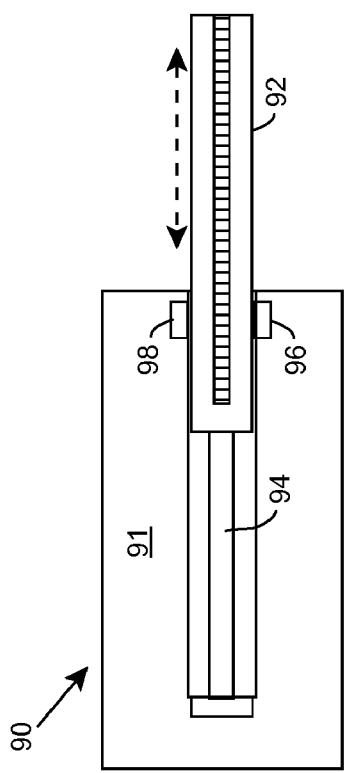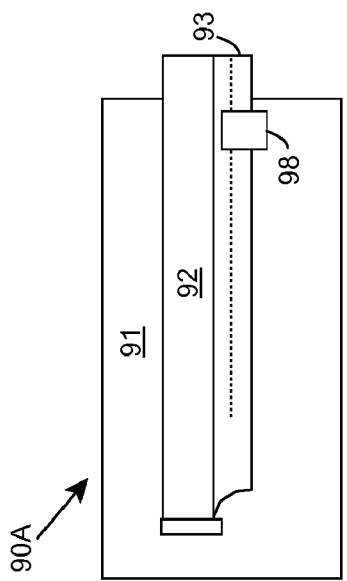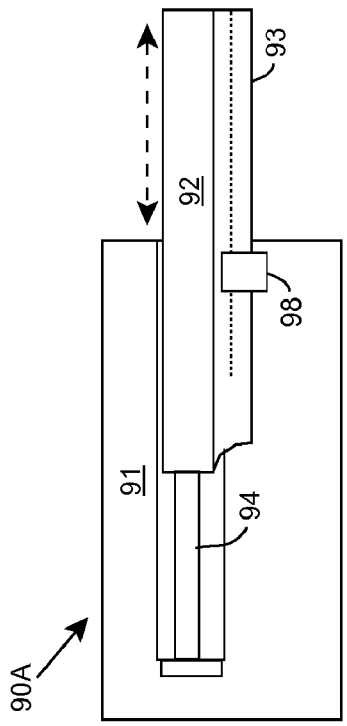

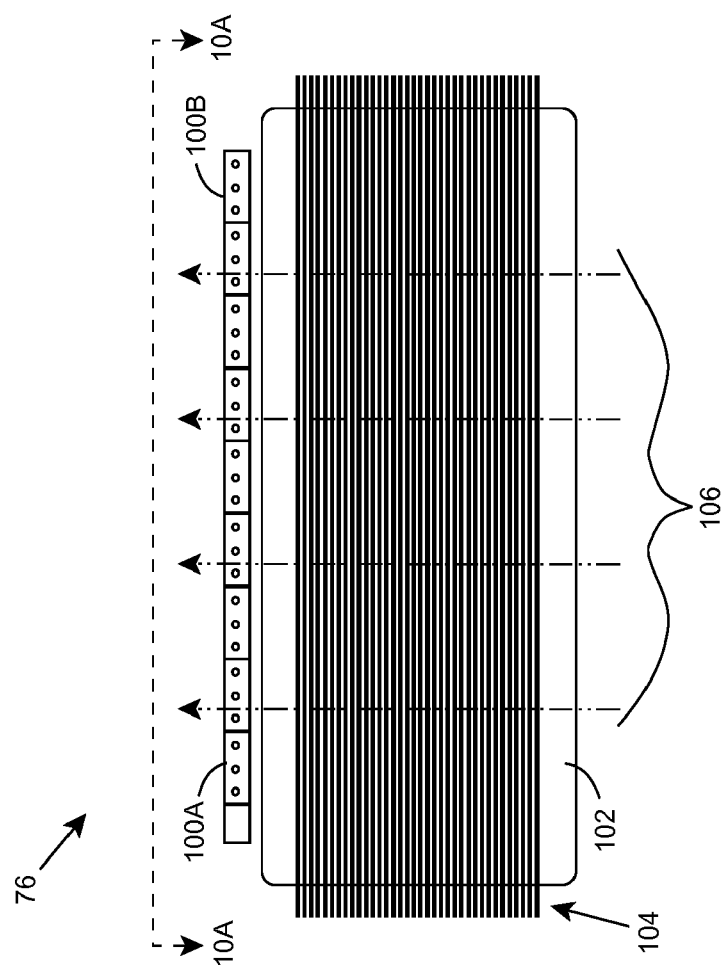
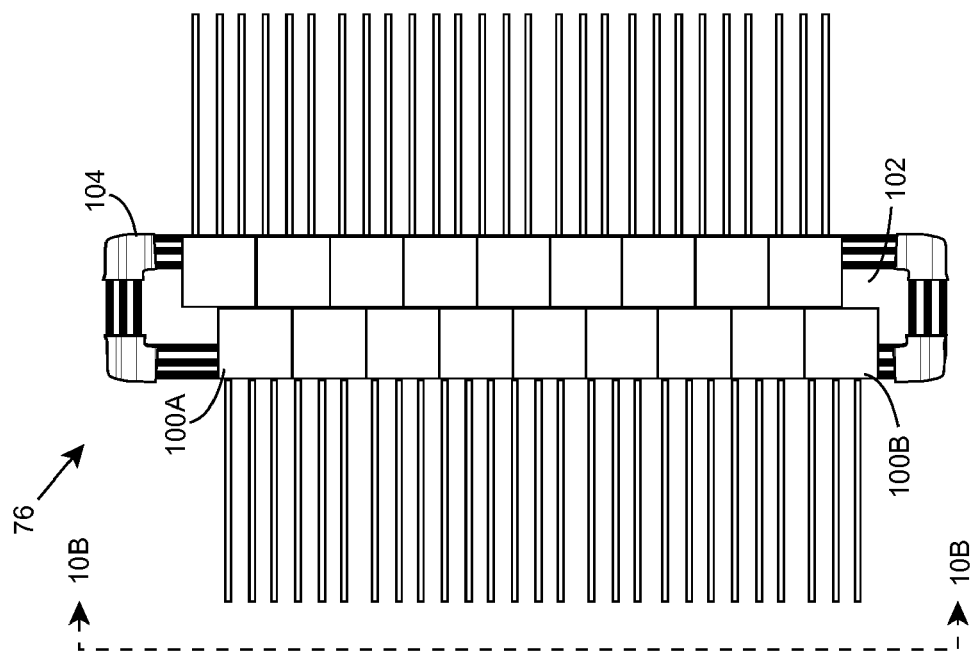

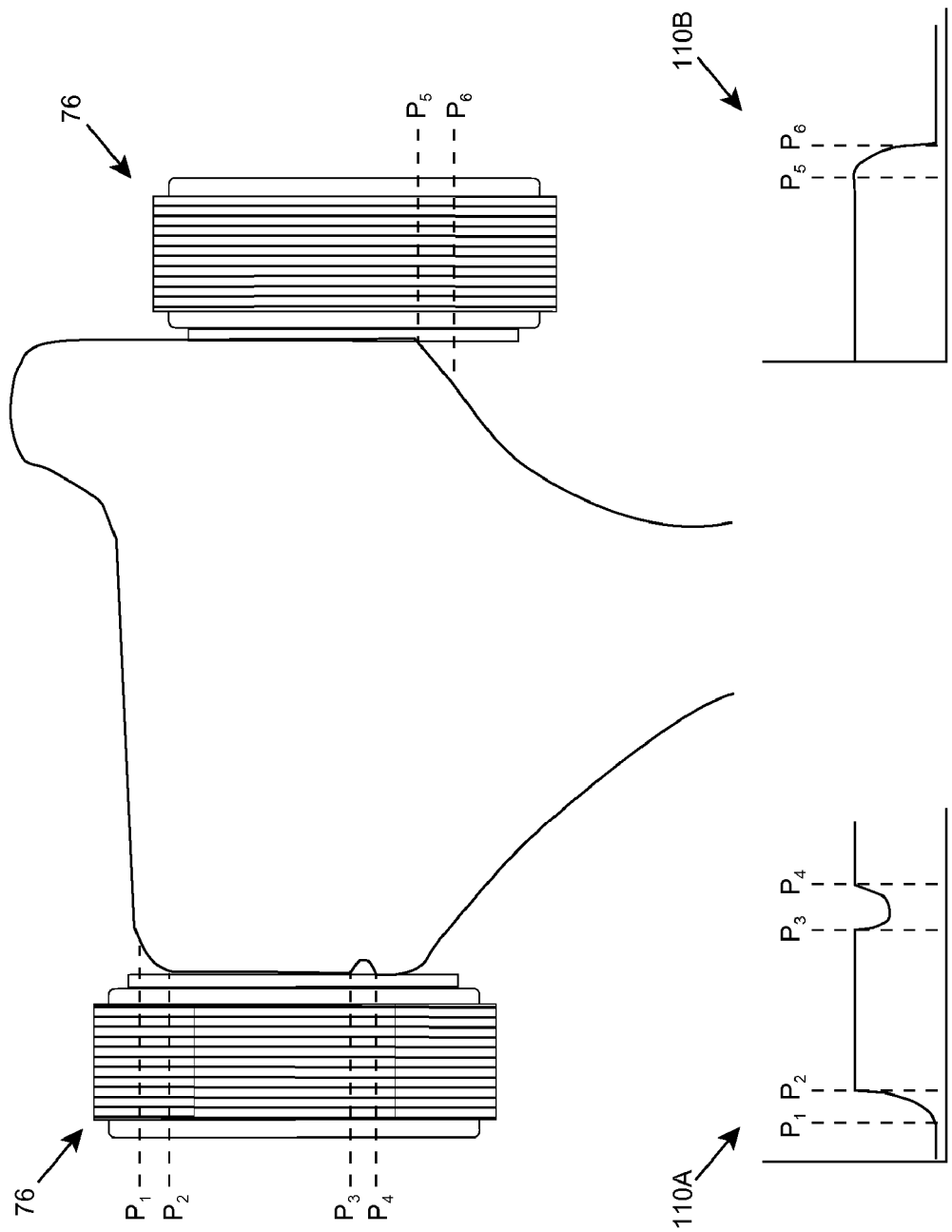

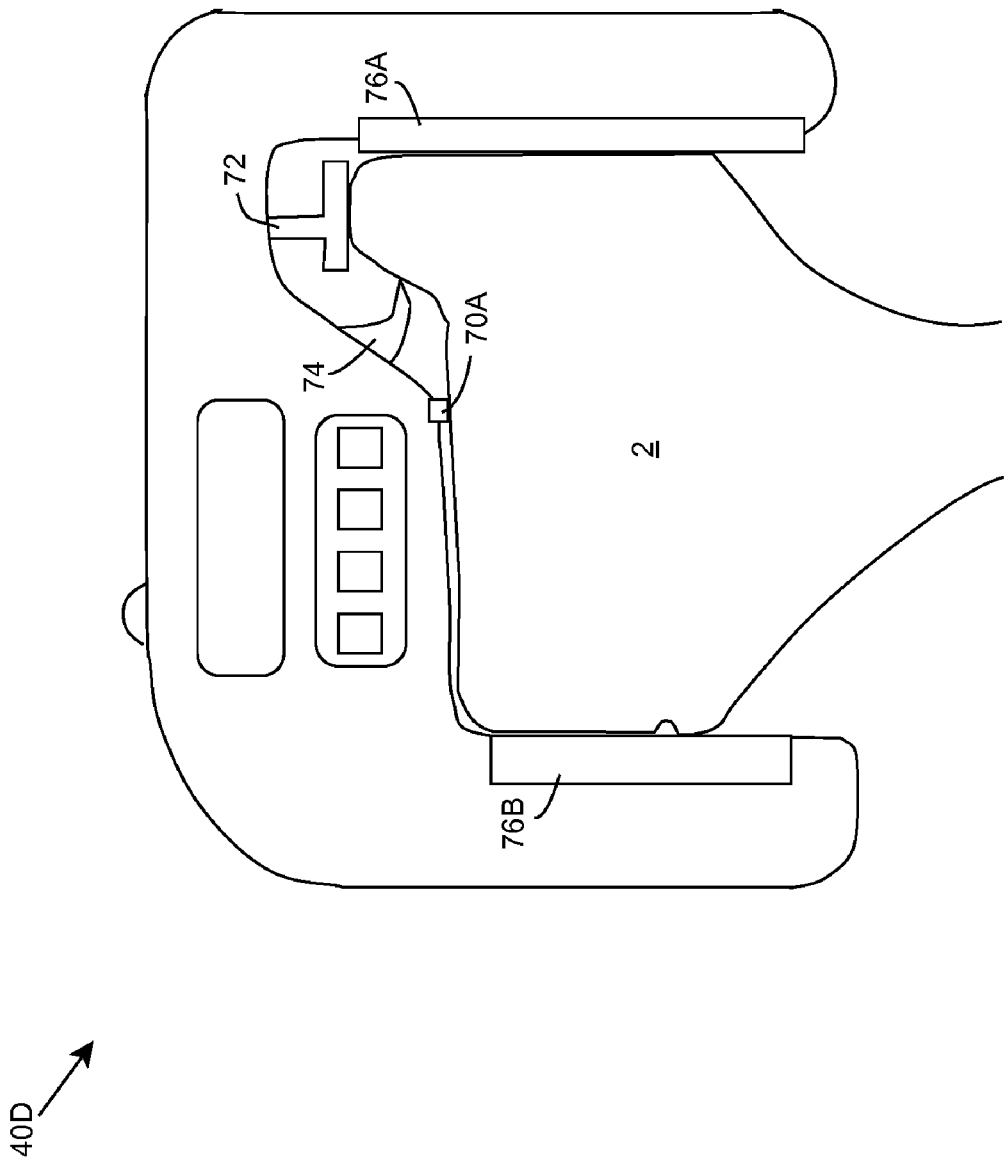

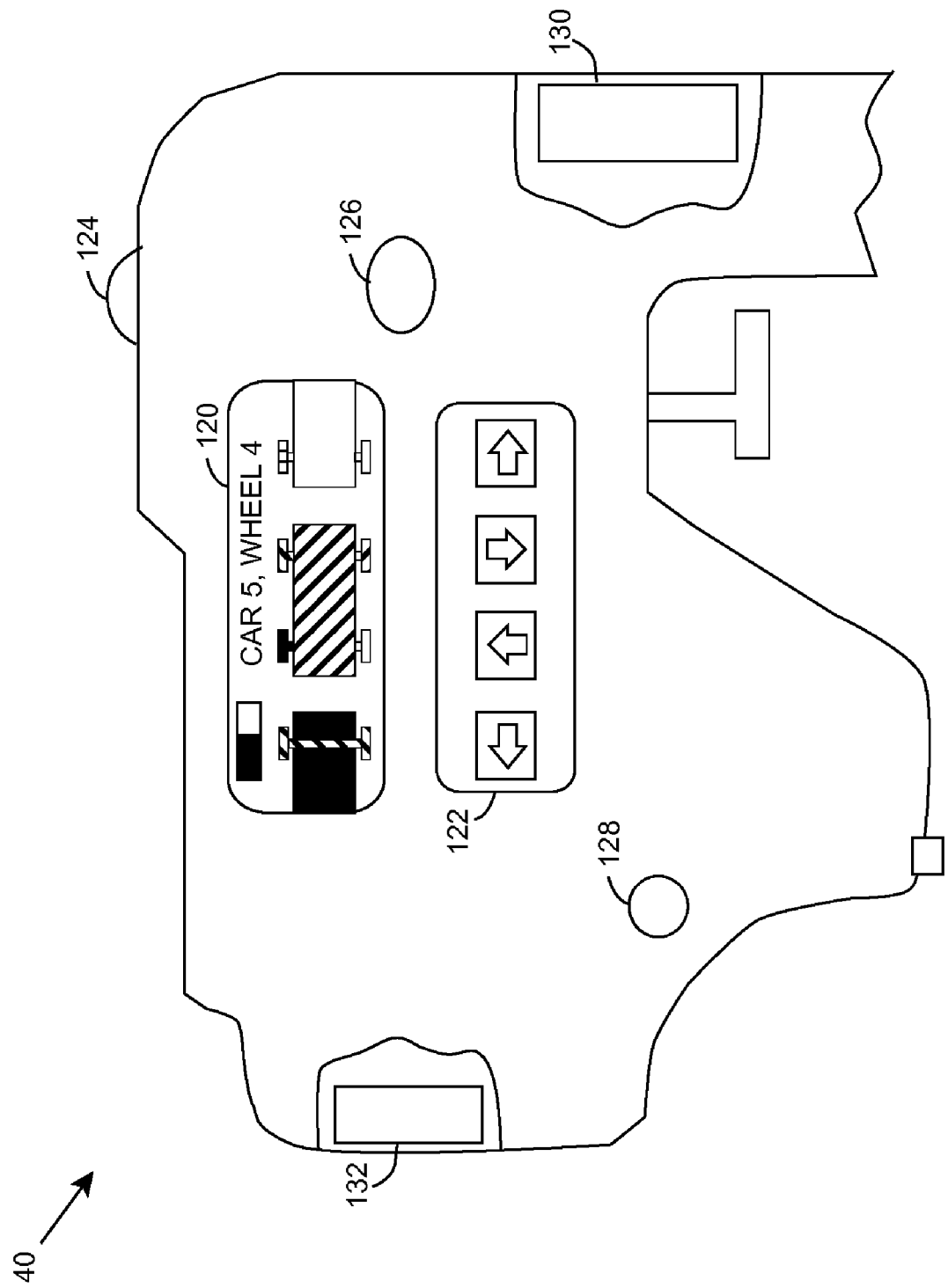

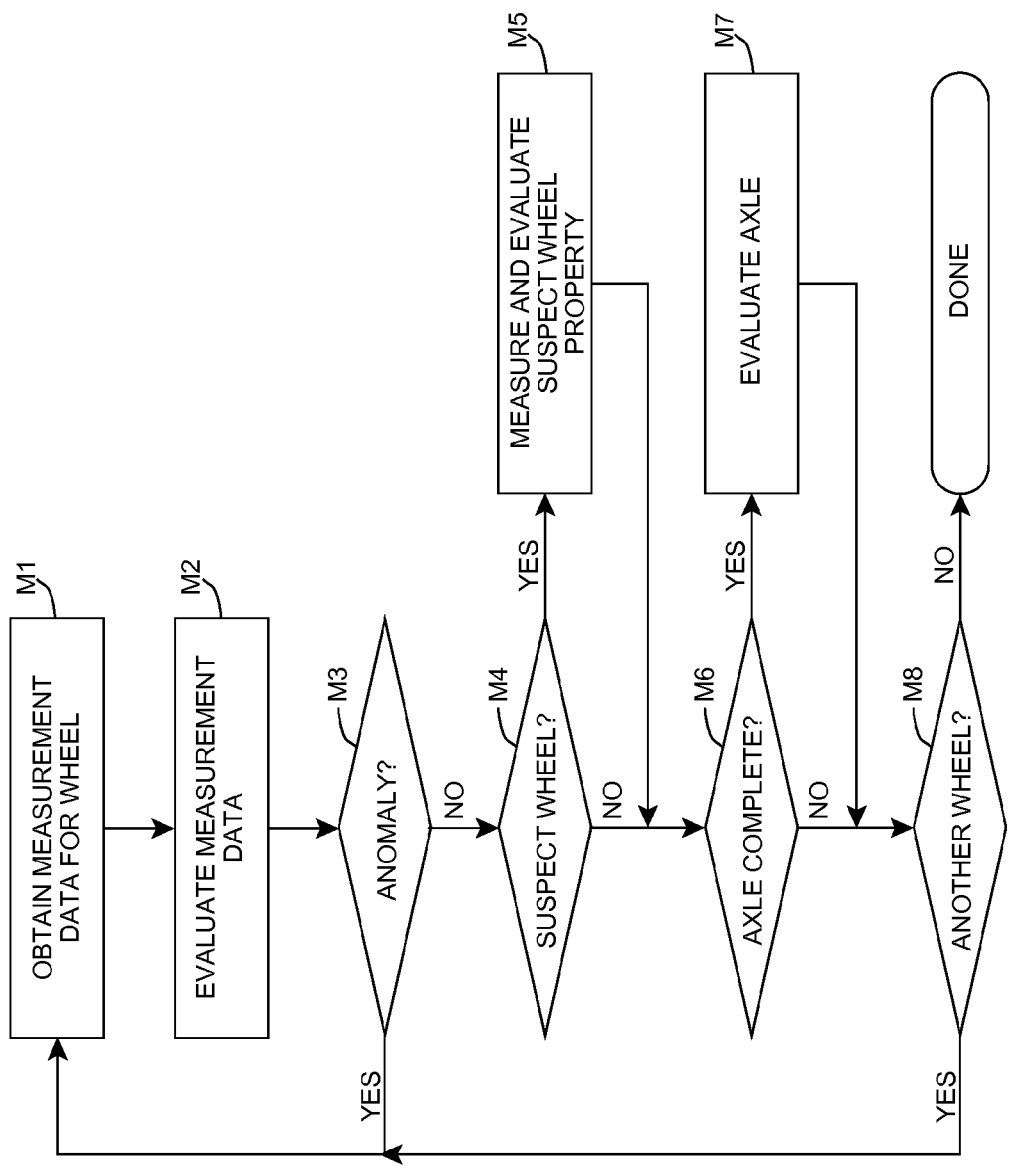

US 7,478,570 B2

WHEEL MEASUREMENT SYSTEMS AND METHODS

REFERENCE TO RELATED APPLICATIONS

The current application claims the benefit of U.S. Provisional Application No. 60/723,441, filed on 5 Oct. 2005, which is hereby incorporated herein by reference. The application also is related in certain aspects to the co-owned, U.S. utility patent application Ser. No. 11/134,944, filed on 23 May 2005, and entitled "Portable Electronic Measurement" and the co-owned, U.S. utility patent application Ser. No. 11/136,207, filed on 24 May 2005, and entitled "Inspection Method, System, and Program Product", both of which are hereby incorporated herein by reference.

FIELD OF THE INVENTION

Aspects of the invention relate generally to wheel measurement, and more particularly, to an improved solution for measuring a railway wheel.

BACKGROUND OF THE INVENTION

Railroad cars and engines utilize railway wheels having a standardized design. In general, each railway wheel is made of solid steel and is formed to a very precise pattern. Over time, due to the immense stress placed on a railway wheel (e.g., an individual car may weigh over 300,000 pounds), the railway wheel wears. This wear can lead to an unsafe operating condition, particularly in light of the use of solid axles on railroad cars/engines, which cannot readily accommodate uneven wear. Eventually, a railway wheel will become unsafe to operate by posing a high potential for derailment or breakage.

FIGS. 1A-B show a portion of an illustrative railway wheel 2 before and after experiencing wear, respectively. During operation, a tread surface 4 supports railway wheel 2 (and the corresponding rail car/engine) as it moves along the rail, while a flange 6 prevents railway wheel 2 from leaving the rail due to outward forces exerted on railway wheel 2. As wear progresses on railway wheel 2, a thickness of flange 6, T', decreases from an original thickness T. Similarly, due to wear on tread surface 4, an effective height of flange 6, H', increases from an original height H.

After sufficient wear, a railway wheel 2 can be recut/retrued so that it can be safely used. In particular, tread surface 4 and flange 6 are ground to form a safe profile of railway wheel 2, such as that shown in FIG. 1A. This operation is expensive and time consuming. As a result, it is desirable to minimize the instances in which a railway wheel 2 is recut/retrued unnecessarily. To this extent, a railway wheel 2 must have a minimum rim thickness, R, in order to safely operate. The rim thickness of railway wheel 2 can be measured using a reference groove 8, if available, resulting in a rim thickness measurement $R_G$, or using a rim break point 9, which results in a rim thickness measurement $R_B$.

Frequently, railway wheels 2, even when installed on the same rail car/engine, do not experience an even or predictable amount of wear. To this extent, railway wheels 2 on the same axle of a rail car/engine may become unsafe when the relative diameters are sufficiently different due to uneven wear. In particular, since railway wheels 2 are connected by a solid axle, a smaller diameter railway wheel 2 may introduce a force in the system that turns toward the smaller railway wheel 2. As a result of the force, the railway wheel 2 may "ride up" over the rail, causing a derailment. As a result, a diameter of railway wheel 2 can be measured, which can be determined based on the measured rim thickness R of the wheel and the corresponding type of railway wheel 2.

As a result, a need exists for accurately measuring various features of a railway wheel 2, such as flange thickness T, flange height H, rim thickness R, diameter, and/or the like. Errors in measurements can lead to an unacceptable railway wheel 2 remaining in service, which presents a potential safety and liability hazard, increases noise, wear, and fuel consumption for the train, and the like. Additionally, a railway wheel 2 may be mistakenly condemned when it could have been retrued, which wastes a viable railway wheel 2. Further, a railway wheel 2 that should be condemned may be sent for retruing, which wastes time and disrupts the operation of a truing shop.

Several devices have been proposed to obtain measurements of railway wheel 2. One such device comprises a mechanical caliper-style gauge that looks like an inverted "J". In use, the gauge is hooked onto a railway wheel 2 and the measurements are read from scale markings imprinted on the gauge. However, this gauge is difficult to use when railway wheel 2 is installed on a rail car/engine due to the presence of other components (e.g., brakes, shock absorbers, axle supports, etc.), as well as other ambient conditions, such as lighting, precipitation, etc. Additionally, the measurements must be manually recorded, which may result in data-entry errors.

To address this situation, several proposals have been made for performing electronic railway wheel/rail measurement. However, each of these proposals includes one or more limitations. For example, some proposals only measure a subset of the required attributes, such as a rim profile. Additionally, some proposals are not portable, require additional computing capability, and/or cannot provide data to a remote system. Further, current solutions are limited in the speed with which measurements can be taken, as well as an overall integration into a complete wheel management system.

In view of the foregoing, a need exists to overcome one or more of the deficiencies in the related art.

BRIEF SUMMARY OF THE INVENTION

Aspects of the invention provide an improved maintenance, inspection, and/or measurement solution. An embodiment of the invention includes a handheld measurement device for measuring an object, such as a railway wheel on a train. The handheld measurement device can comprise a single unit to provide one handed operation and can include various features, such as onboard evaluation, a graphical user interface, and/or a self-health monitor. Additionally, aspects of the invention provide an inspection environment that incorporates preliminary measurement data, wireless communications, and/or historical data into the measurement and evaluation process. In this manner, embodiments of the invention can improve the efficiency and reliability of an inspection and/or maintenance process for a vehicle having wheels, e.g., a train.

A first aspect of the invention provides a handheld measurement device comprising: a system for obtaining a plurality of measurements for a wheel; and a system for evaluating at least one of the plurality of measurements with at least one anticipated wheel property to determine a validity of the at least one of the plurality of measurements.

A second aspect of the invention provides a measurement system comprising: a handheld measurement device including: a system for managing an inspection schedule; a system for obtaining a plurality of measurements for a wheel; and a system for managing a plurality of measurement modes.

A third aspect of the invention provides a handheld measurement device comprising: a system for obtaining a plurality of measurements for an object; and a system for monitoring an operability of the device based on a set of operational environment attributes of the measurement device.

A fourth aspect of the invention provides a method of generating a system for measuring a set of objects, the method comprising: providing a computer system operable to measure each of the set of objects as described herein.

A fifth aspect of the invention provides a business method for managing wheel measurement and/or a train inspection, the business method comprising managing a computer system that performs the process described herein; and receiving payment based on the managing.

The illustrative aspects of the present invention are designed to solve one or more of the problems herein described and/or one or more other problems not discussed.

BRIEF DESCRIPTION OF THE SEVERAL VIEWS OF THE DRAWINGS

These and other features of the invention will be more readily understood from the following detailed description of the various aspects of the invention taken in conjunction with the accompanying drawings that depict various embodiments of the invention.

FIGS. 4A-C show several illustrative measurement devices according to embodiments of the invention.

FIGS. 8A-B show two views of an illustrative incremental position linear sensor according to an embodiment of the invention.

FIGS. 9A-B show two views of an alternative incremental position linear sensor according to an embodiment of the invention.

FIGS. 10A-B show two views of an illustrative rim thickness sensor that functions based on the Hall Effect according to an embodiment of the invention.

FIG. 11 shows a rim thickness sensor placed in two illustrative measurement locations on a railway wheel and the resulting measurement graphs according to an embodiment of the invention.

FIG. 12 shows an illustrative measurement device according to an embodiment of the invention.

FIG. 13 shows a more detailed view of an illustrative group of interface devices for a measurement device according to an embodiment of the invention.

FIG. 15 shows an illustrative process for inspecting a set of wheels according to an embodiment of the invention.

It is noted that the drawings are not to scale. The drawings are intended to depict only typical aspects of the invention, and therefore should not be considered as limiting the scope of the invention. In the drawings, like numbering represents like elements between the drawings.

DETAILED DESCRIPTION OF THE INVENTION

As indicated above, aspects of the invention provide an improved maintenance, inspection, and/or measurement solution. An embodiment of the invention includes a handheld measurement device for measuring an object, such as a railway wheel on a train. The handheld measurement device can comprise a single unit to provide one handed operation and can include various features, such as onboard evaluation, a graphical user interface, and/or a self-health monitor. Additionally, aspects of the invention provide an inspection environment that incorporates preliminary measurement data, wireless communications, and/or historical data into the measurement and evaluation process. In this manner, embodiments of the invention can improve the efficiency and reliability of an inspection and/or maintenance process for a vehicle having wheels, e.g., a train. As used herein, unless otherwise expressly noted, the term "set" means one or more (i.e., at least one) and the phrase "any solution" means any now known or later developed solution.

For convenience, the remainder of the Detailed Description of the Invention includes the following headers.

I. ILLUSTRATIVE RAILWAY WHEEL MEASUREMENTS
II. WHEEL MANAGEMENT SYSTEM
III. HANDHELD MEASUREMENT DEVICE
  A. DEVICE CONFIGURATIONS
  B. PLACEMENT FEATURES
  C. ACQUISITION FEATURES
    1. ILLUSTRATIVE MEASUREMENT COMPONENTS
    2. MEASUREMENT EVALUATION AND MODAL OPERATION
  D. INTERFACE FEATURES
  E. SELF-HEALTH FEATURES
IV. ALTERNATIVES

I. Illustrative Railway Wheel Measurements

Turning to the drawings, as discussed previously, FIGS. 1A-B show a portion of an illustrative railway wheel 2 before and after experiencing wear, respectively. In general, it is desirable to accurately measure railway wheel 2 to determine an amount of wear experienced on railway wheel 2. Based on these measurements, railway wheel 2 can be deemed safe, sent for recutting/retruing, condemned, or the like. Typically, measurements such as flange thickness T, flange height H, and rim thickness R (e.g., $R_G$ based on reference groove 8, $R_B$ based on rim break 9, and/or the like) are obtained and used to make a determination with respect to an operability of railway wheel 2. Additional measurements, such as a flange angle, also can be obtained and used. It is understood that these measurements and railway wheel 2 are only illustrative of various objects and/or measurements, which can be measured using an embodiment of the invention. To this extent, the invention is not limited to railway wheel 2, wheels in general, and/or these particular measurements.

Figure 1A:
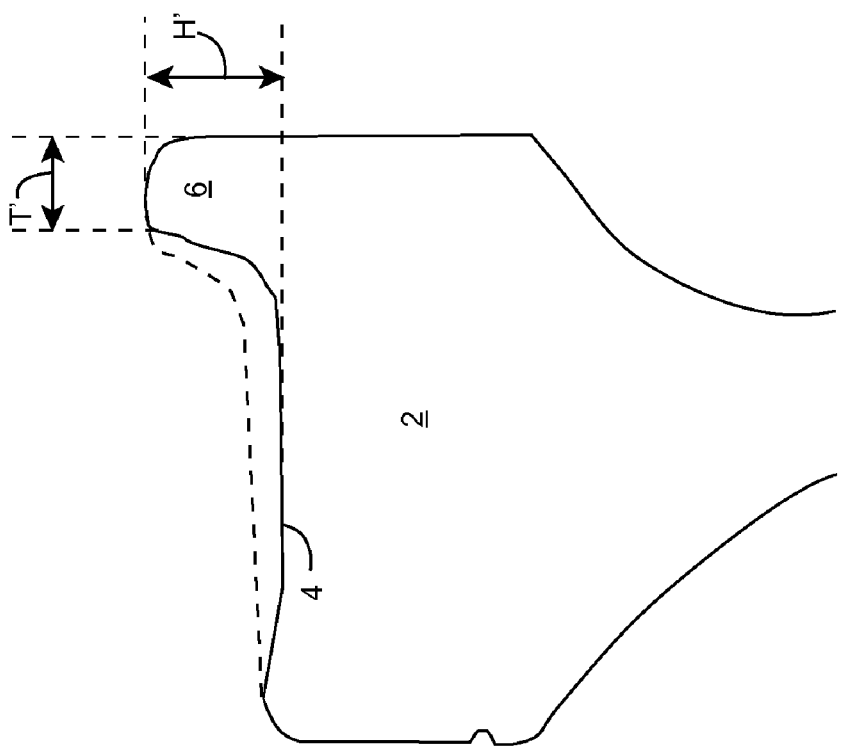
FIGS. 1A-B show a portion of an illustrative railway wheel before and after experiencing wear, respectively.
Figure 2:
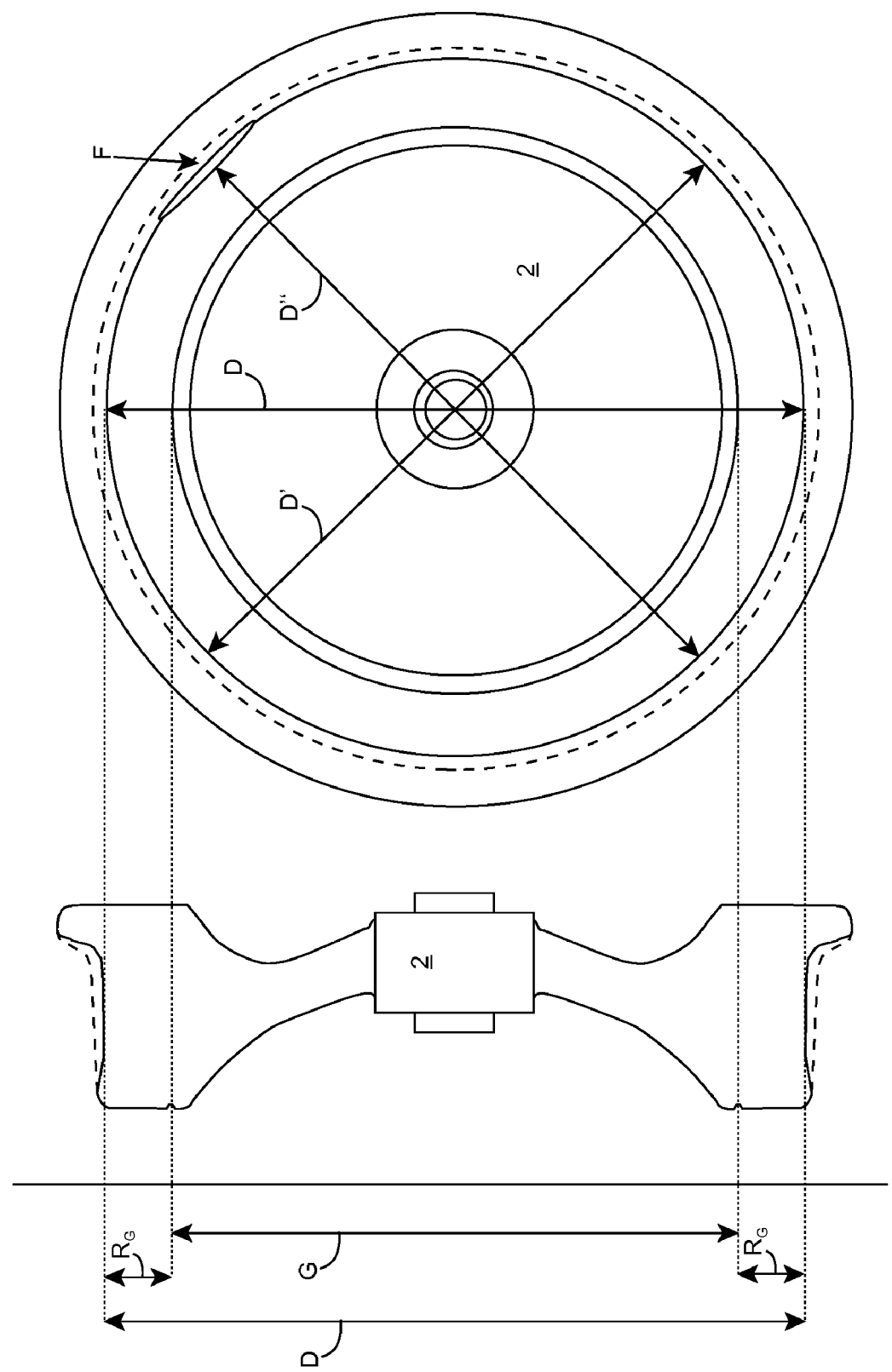
FIG. 2 shows a profile and exterior view of another illustrative railway wheel.

In any event, FIG. 2 shows a profile and exterior view of another illustrative railway wheel 2. As shown, another measurement for railway wheel 2 is its diameter, D, which is defined as a distance from a point in the running center of tread surface 4 (FIG. 1A), through a center of railway wheel 2, to an equivalent point in the running center of tread surface 4 on the opposite side of railway wheel 2. Since wear is generally even for railway wheel 2, the diameter D can be calculated using other available measurement(s). For example, diameter D can be calculated by adding twice the measured rim thickness, e.g., $R_G$, to a known diameter of the reference groove, G. Diameter D can be used in evaluating whether railway wheel 2 can be retrued or must be condemned, whether two railway wheels 2 on the same axle have diameters that differ too greatly, and/or the like.

In general, railway wheels 2 will comprise a fairly uniform diameter D regardless of the location on railway wheel 2 at which the measurements are obtained, e.g., D' will be substantially similar to D. However, railway wheels 2 may experience uneven wear in some circumstances. For example, railway wheel 2 may have slid significantly on a rail due to a brake malfunction or the like. In this case, tread surface 4 (FIG. 1A) is preferentially worn at a point of contact with the rail during the sliding, yielding a flat spot F. Flat spot F will result in a diameter D" that is less than diameter D. The presence of flat spot F can drastically increase wear, increase noise pollution, reduce efficiency, create more dangerous conditions, and/or the like. Consequently, another measurement that can be obtained for railway wheel 2 is an extent and/or depth of flat spot F.

II. Wheel Management System

Figure 3:
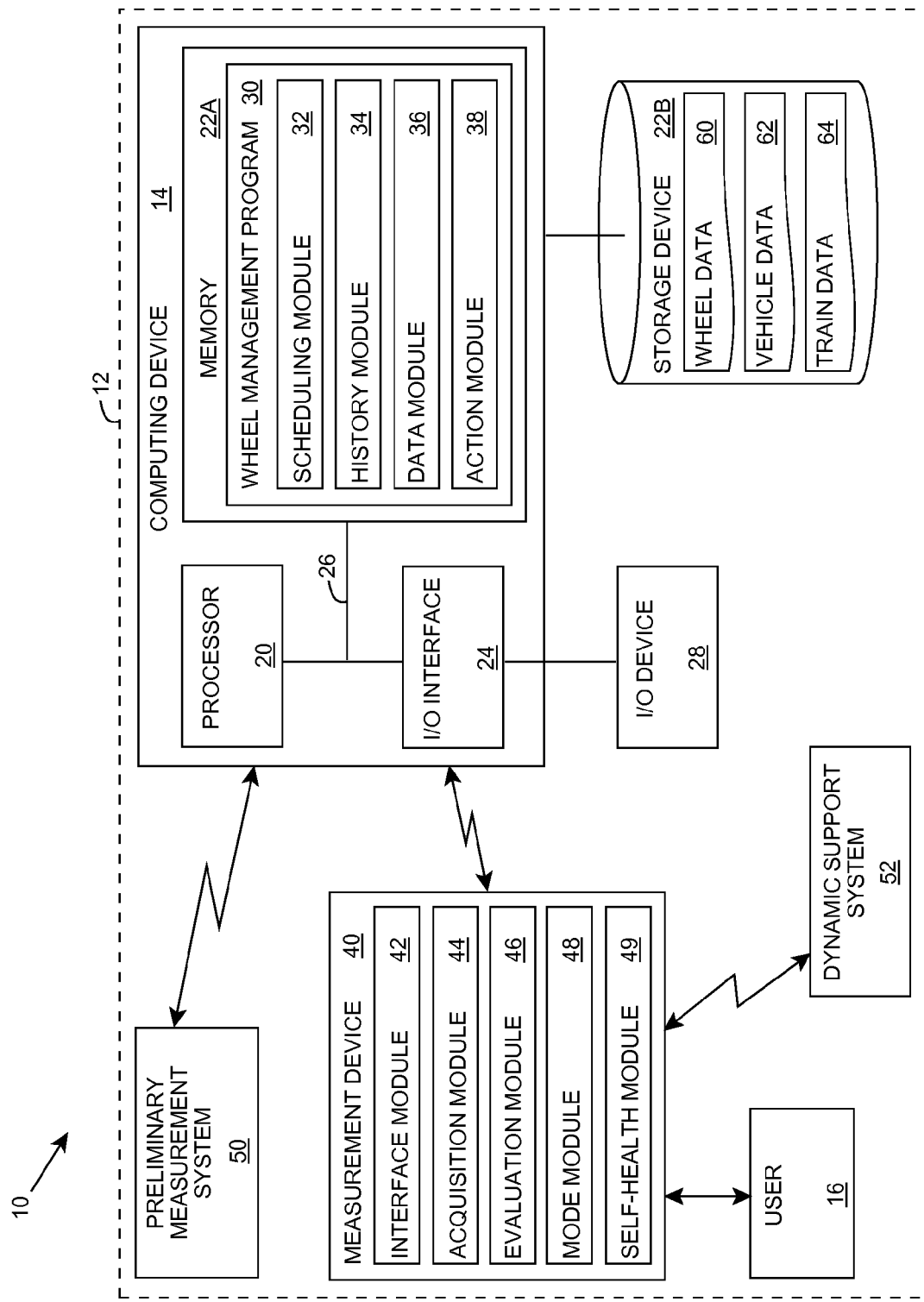
FIG. 3 shows an illustrative environment for managing a set of wheels according to an embodiment of the invention.

An embodiment of the invention provides an improved wheel management system for obtaining wheel measurements and/or taking one or more actions in response to these measurements. To this extent, FIG. 3 shows an illustrative environment 10 for managing a set of wheels according to an embodiment of the invention. Environment 10 includes a computer system 12 that can perform the process described herein in order to manage wheels and/or wheel data 60. In particular, computer system 12 is shown including a computing device 14 that comprises a wheel management program 30, which makes computing device 14 operable to process wheel data 60 according an embodiment of the invention. Further, computer system 12 is shown including a measurement device 40 and a preliminary measurement system 50 for obtaining wheel data 60 for a set of wheels (e.g., on a train). Computer system 12 also can include a dynamic support system 52 for updating the operating capacity of measurement device 40. Operation of the various systems/devices of computer system 12 are discussed further herein. However, it is understood that alternative embodiments of computer system 12 may not include all of the systems/devices shown and described and/or may include additional systems/devices not shown.

Regardless, computing device 14 is shown including a processor 20, a memory 22A, an input/output (I/O) interface 24, and a bus 26. Further, computing device 14 is shown in communication with an external I/O device/resource 28 and a storage device 22B. In general, processor 20 executes program code, such as wheel management program 30, which is stored in a storage system, such as memory 22A and/or storage device 22B. While executing program code, processor 20 can read and/or write data, such as wheel data 60, to/from memory 22A, storage device 22B, and/or I/O interface 24. Bus 26 provides a communications link between each of the components in computing device 14. I/O device 28 can comprise any device that transfers information between a user (an individual and/or another device/system) and computing device 14. To this extent, I/O device 28 can comprise a user I/O device to enable an individual user to interact with computing device 14 and/or a communications device to enable a system user, such as measurement device 40 and/or preliminary measurement system 50, to communicate with computing device 14 using any type of communications link.

In any event, computing device 14 can comprise any general purpose computing article of manufacture capable of executing program code installed thereon. However, it is understood that computing device 14 and wheel management program 30 are only representative of various possible equivalent computing devices that may perform the process described herein. To this extent, in other embodiments, the functionality provided by computing device 14 and wheel management program 30 can be implemented by one or more computing article(s) of manufacture that includes any combination of general and/or specific purpose hardware and/or program code. In each embodiment, the program code and hardware can be created using standard programming and engineering techniques, respectively.

It is understood that measurement device 40, preliminary measurement system 50, and/or dynamic support system 52 each can comprise similar components as shown and described with respect to computing device 14. Additionally, the various devices/systems in computer system 12 can communicate over any combination of various types of communications links, such as a network, a shared memory, or the like, to perform the process described herein. Further, while performing the process described herein, one or more devices/systems in computer system 12 can communicate with one or more other devices/systems external to computer system 12 using any type of communications link. Regardless, the communications link(s) can comprise any combination of various types of wired and/or wireless links; comprise any combination of one or more types of networks; and/or utilize any combination of various types of transmission techniques and protocols.

In an embodiment of the invention, measurement device 40 comprises a handheld measurement device that communicates with computing device 14 and/or dynamic support system 52 using any type of wireless communications link. Further, measurement device 40 can comprise a network-addressable computing device, which enables communications between measurement device 40 and computing device 14, dynamic support system 52, and/or other devices/systems to occur over any public or private network, such as a local area network (LAN), the Internet, or the like. For example, measurement device 40 can include a communications device that complies with the IEEE 802.11 wireless Ethernet standard (e.g., a Wireless-Fidelity (Wi-Fi) network device) to implement wireless network communications. It is understood that measurement device 40 can utilize any combination of various wireless communications solutions, including IEEE 802.15.4 (e.g., "ZigBee") compliant communications, infrared communications, acoustic data transfer, laser communications, and/or the like. Additionally, it is understood that the communications can be secured (e.g., encrypted) using any solution.

As discussed herein, measurement device 40 obtains wheel data 60 for a wheel, such as a railway wheel. To this extent, measurement device 40 is shown including an interface module 42, an acquisition module 44, an evaluation module 46, a mode module 48, and a self-health module 49. Additionally, wheel management program 30 enables computer system 12 to manage the evaluation of a set of wheels and the corresponding wheel data 60. To this extent, wheel management program 30 is shown including a scheduling module 32, a history module 34, a data module 36, and an action module 38. Operation of each of these modules is discussed further herein. However, it is understood that some of the various modules shown in FIG. 3 can be implemented independently, combined, and/or stored in memory of one or more separate computing devices that are included in computer system 12. Further, it is understood that some of the modules and/or functionality may not be implemented, or additional modules and/or functionality may be included as part of computer system 12.

Regardless, the invention provides a solution for managing a set of wheels. To this extent, environment 10 can be implemented at a train yard or the like, in which railway wheels included on a train are measured and evaluated for continued operation. Similarly, environment 10 can be implemented at a wheel manufacturing and/or retruing location. It is understood that environment 10 can be implemented in various other embodiments and applications and therefore is not limited to these illustrative applications.

Figure 14:
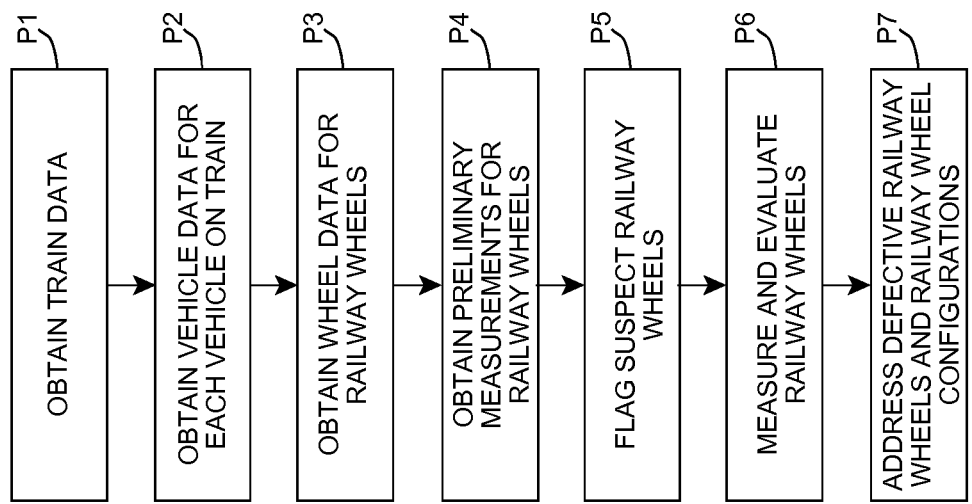
FIG. 14 shows an illustrative process for managing a train inspection according to an embodiment of the invention.

In any event, scheduling module 32 can manage a wheel measurement schedule for a set of railway wheels, such as all railway wheels on a train, newly manufactured/retrued railway wheels, and/or the like. To this extent, FIG. 14 shows an illustrative process for managing a train inspection according to an embodiment of the invention. Referring to FIGS. 3 and 14, in process P1, scheduling module 32 can obtain train data 64 for a train to be evaluated (e.g., from an individual user, another system, and/or the like). The train data 64 can include information on the train, such as a train identification, a scheduled arrival, a destination, a track number, a scheduled departure time, a number of vehicles (e.g., locomotive(s), railcar(s), etc.), and/or the like. Using train data 64, scheduling module 32 can generate an inspection schedule for the train. The inspection schedule can include an identifier for the train, an estimated start time for the inspection, a location of the train, an estimated time period for completing the inspection, as well as a blank inspection record for each vehicle on the train, and railway wheel on the vehicle.

When implemented at a rail yard, a plurality of trains may be present in the rail yard, each requiring inspection. To this extent, scheduling module 32 can manage a plurality of inspection schedules, one for each train. In particular, scheduling module 32 can schedule an order of the inspections based on the arrival/departure of each train, a number of vehicles in each train, and/or the like. Once completed, scheduling module 32 can transmit one or more inspection schedules to measurement device 40. In an embodiment, a user 16, such as a train inspector, carries measurement device 40 and performs the inspection according to the inspection schedule. To this extent, computer system 12 can include a plurality of measurement devices 40, one for each of a plurality of inspectors. In this case, scheduling module 32 can transmit a subset of the inspection schedules (e.g., one train each) and/or a subset of a particular inspection schedule (e.g., first twenty vehicles/last twenty vehicles) to each measurement device 40 for implementation by users 16.

Additionally, train data 64 can be linked (e.g., using an identifier) to one or more vehicles that are part of the train. In this case, in process P2, history module 34 can obtain vehicle data 62 for each vehicle included in the train using the link. The vehicle data 62 can include information such as the contents, a weight, an operating history, and/or the like, for the vehicle. Further, train data 64 and/or vehicle data 62 can include information on the relative locations of the vehicles in the train. Still further, the vehicle data 62 can be linked (e.g., using an identifier) to wheel data 60 for each railway wheel on the vehicle. To this extent, in process P3, history module 34 can obtain wheel data 60 for each railway wheel on the train, which can include an operating history, a measurement history, etc., for the wheel, for a set of wheels on an axle, and/or the like. It is understood that wheel data 60, vehicle data 62, and train data 64 can be stored using any solution. For example, the data can be stored as entries in tables of a relational database. Additionally, it is understood that scheduling module 32 and/or history module 34 can obtain the data using any solution, e.g., from another system, from a storage device based on an identifier, as input from a user, and/or the like.

Scheduling module 32 also can include vehicle data 62 and/or wheel data 60 in an inspection schedule for a train. For example, scheduling module 32 can pre-populate an inspection record for each vehicle on the train with an identification of the vehicle (e.g., obtained from vehicle data 62), an identification/location for each wheel on the vehicle (e.g., obtained from wheel data 60), and/or the like. In this case, during an inspection, an inspector (user 16) can visually confirm that the vehicle being inspected matches the vehicle identified in the record, that the wheel being inspected matches the wheel identified in the record, and/or the like. When a mismatch occurs, the data can be modified, a temporary record can be created, and/or the like, and the vehicle/wheel data can be later updated and corrected. In this manner, a vehicle/wheel inspection history can be accurately maintained and updated.

Still further, in process P4, data module 36 can obtain preliminary measurement data for the railway wheels on the train from preliminary measurement system 50 using any solution. Preliminary measurement system 50 can comprise any measurement solution that obtains wheel data 60 for each railway wheel on the train. In an embodiment of the invention, preliminary measurement system 50 is capable of obtaining wheel data 60 while the train is moving (e.g., as the train enters the yard). To this extent, preliminary measurement system 50 can comprise a fixed platform or the like that obtains wheel data 60 using a contactless solution (e.g., line(s) of light), such as those shown and described in U.S. Pat. No. 6,768,551 and commonly owned, co-pending U.S. patent application Ser. No. 11/324,894, filed on 4 Jan. 2006, and entitled "Optical Wheel Evaluation", both of which are incorporated herein by reference. Similarly, in a manufacturing/truing shop or the like, preliminary measurement system 50 can comprise any measurement solution that obtains wheel data 60 for each manufactured/retrued railway wheel, e.g., using a contactless solution.

Subsequently, action module 38 can process the preliminary measurement data to determine whether any additional inspection actions should be performed, and scheduling module 32 can generate an inspection schedule based on the determination. To this extent, in process P5, action module 38 can flag any suspect wheel(s) based on the preliminary measurement data. For example, action module 38 can determine whether the preliminary measurement data indicates that a railway wheel includes a flat spot, is out-of-round, includes damage, and/or the like. If so, scheduling module 32 can add a follow up evaluation to be performed by user 16, e.g., using measurement device 40 to the inspection schedule. For example, as described further herein, user 16 can use measurement device 40 to measure a severity of a flat spot. Alternatively, user 16 can perform a manual/visual inspection of the railway wheel and manually enter a result of the follow up inspection into measurement device 40 as measurement data.

In process P6, a set of measurement devices 40 and/or wheel management system 30 can measure and evaluate the wheels. During this process, data module 36 can obtain measurement data from each measurement device 40 using any solution. In one embodiment, data module 36 receives the measurement data via a wireless communications link. In this case, wheel management program 30 can process the measurement data concurrently with an ongoing inspection. Alternatively, data module 36 can obtain the measurement data once the inspection has completed, e.g., via a wired communications link. In either case, history module 34 can store the measurement data as wheel data 60. Further, history module 34 can update vehicle data 62 and/or train data 64 based on the measurement data, e.g., upon completion of the inspection, history module 34 can update data on a last inspection of the vehicle/train.

Regardless, in process P7, action module 38 can process the measurement data and/or results and schedule/perform any action(s) required to address defective railway wheel(s) and/or railway wheel configuration(s). For example, action module 38 may determine that one or more railway wheels require replacement, retruing, reconfiguration, and/or the like. Typically, a railway wheel will require replacement or retruing when it has worn too much, has physical damage, or the like. A railway wheel may require reconfiguration when a difference between two railway wheels on the same axle and/or a difference between a railway wheel with other railway wheels on a vehicle is sufficiently large. Regardless, action module 38 can generate a set of actions (e.g., an action schedule), which is subsequently implemented by individual(s) at the rail yard. To this extent, action module 38 can communicate the action(s) to one or more maintenance individuals, who can start to perform the required action(s) while the remainder of the inspection is being completed by user(s) 16. In this manner, a turn around time for inspecting a train can be reduced.

Additionally, computer system 12 includes a dynamic support system 52. Dynamic support system 52 can provide remote programming/maintenance for measurement device 40 to help ensure its proper operation. To this extent, dynamic support system 52 can update one or more modules (e.g., program code, database, and/or the like) in measurement device 40 to improve accuracy, add functionality (e.g., a new measurement of a wheel, which can be calculated using other measurement data), customize functionality (e.g., custom calibration tables for custom wheels), and/or the like. For example, a vendor/manufacturer of measurement device 40 may improve a calibration routine included in acquisition module 44, and use dynamic support system 52 to download the update to acquisition module 44 using a wireless network communications link. It is understood that the update from dynamic support system 52 can be performed in response to a request initiated by user 16, automatically in response to a periodic polling performed by measurement device 40, and/or the like. Further, the update can be limited to times when measurement device 40 is not being used, is being recharged, and/or the like.

Additionally, dynamic support system 52 can enable user 16 to obtain help and/or technical support via a wireless Internet connection or the like. To this extent, a user guide, tutorials, help information, and/or the like, can be obtained from dynamic support system 52 and presented to user 16 by measurement device 40. Further, operational parameters for measurement device 40 can be altered using dynamic support system 52. For example, an operating language can be modified from a default language to an alternative language. Similarly, user 16 can customize various presentation aspects (e.g., sounds, images, colors, size, etc.) of a user interface of measurement device 40.

While dynamic support system 52 is shown in communications with measurement device 40, it is understood that dynamic support system 52 can communicate with computing device 14 and/or preliminary measurement system 50. To this extent, dynamic support system 52 also can provide software-related updates (e.g., improved calculations, additional functionality, etc.) to preliminary measurement system 50 and/or wheel management program 30. Further, dynamic support system 52 can provide technical support information on any of the devices/systems to a user of wheel management program 30. Still further, in another embodiment, rather than communicating directly with measurement device 40 or preliminary measurement system 50, dynamic support system 52 can communicate with wheel management program 30, which in turn can provide the data (e.g., updates, technical support, etc.) to measurement device 40 and/or preliminary measurement system 50.

III. Handheld Measurement Device

An embodiment of the invention provides an improved measurement device 40 for measuring objects, such as railway wheels. To this extent, measurement device 40 includes an acquisition module 44 that includes various components for measuring a railway wheel. In particular, acquisition module 44 measures a railway wheel and automatically stores the measurement(s) as electronic data. As discussed herein, measurement device 40 can include any combination of one or more of various features, which improve the reliability, accuracy, and/or the like, of the measured data, improve the usability of measurement device 40, enhance the functionality of measurement device 40, and/or the like, over current devices used in the measurement of railway wheels.

It is understood that measurement device 40 includes one or more computing devices. The computing device(s) implement some or all of the functions of the various modules as discussed herein. For example, a computing device can include one or more programs that implement functionality for each of the modules. To this extent, the computing device can interface with various sensors, emitters, I/O interfaces, communications devices, and/or the like, which can be included in measurement device 40. Further, the computing device can provide temporary and/or long term storage of data used in the operation of the various modules. Still further, the various modules can be implemented in measurement device 40 using a modular approach, which enables a subsystem to be removed/examined without harming or causing failure in another module. In this manner, a module can be quickly replaced enabling measurement device 40 to be returned to service while the replaced module is separately analyzed.

A. Device Configurations

Figure 4B:
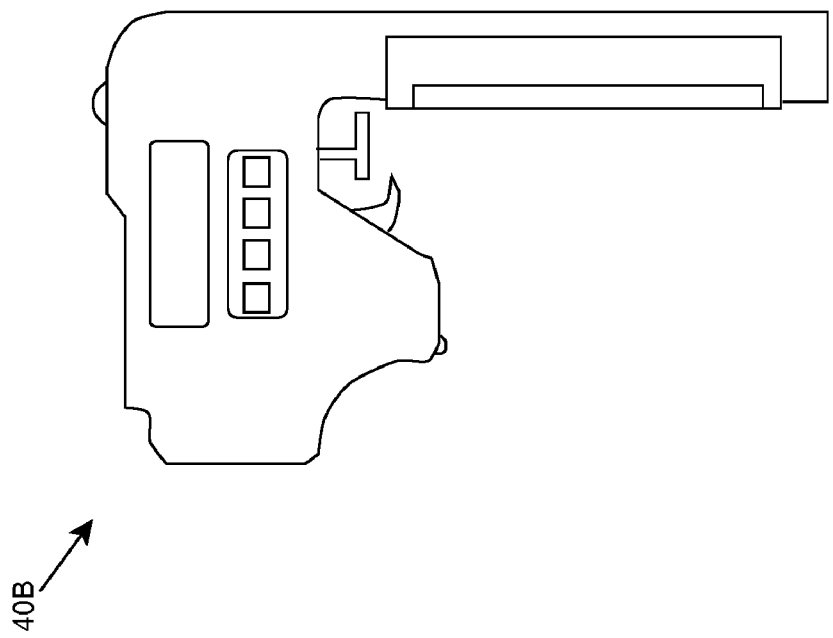
Figure 4A:
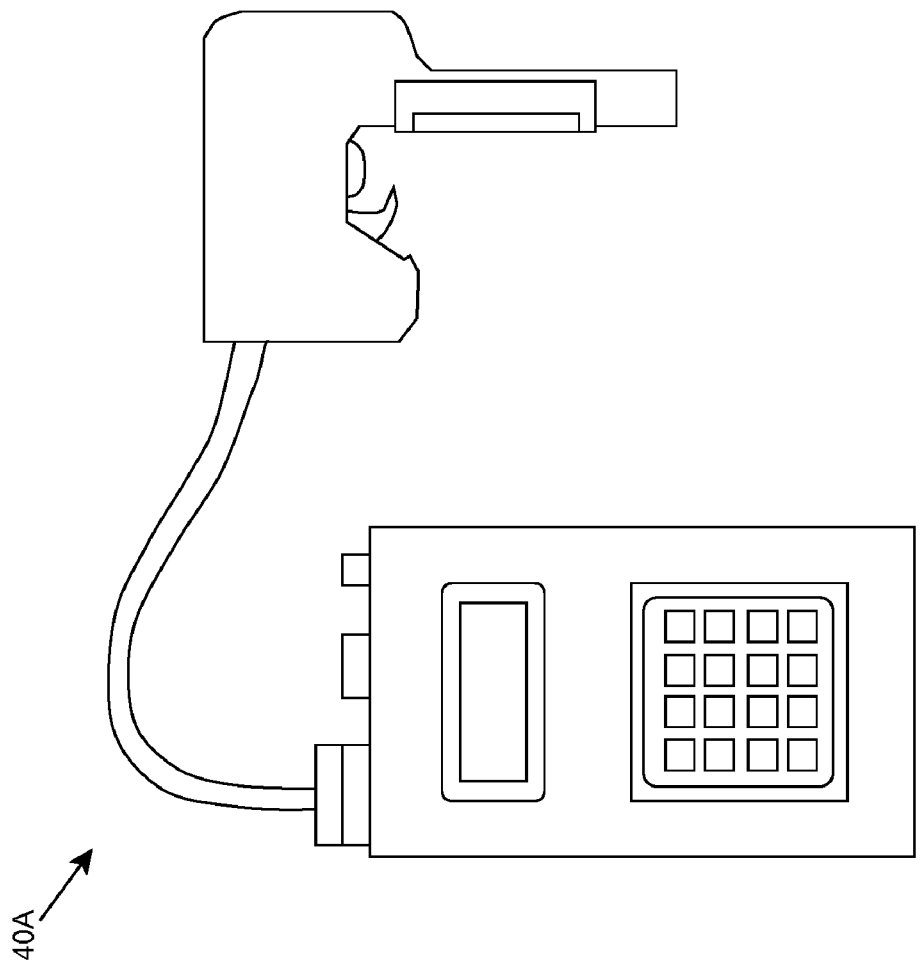

FIGS. 4A-C show several illustrative measurement devices 40A-C according to embodiments of the invention. Measurement devices 40A, 40C include similar configurations as shown and described in U.S. Pat. No. 4,904,939 and the co-pending, co-owned U.S. patent application Ser. No. 11/134,944, filed on 23 May 2005, and entitled "Portable Electronic Measurement", both of which are hereby incorporated herein by reference. However, measurement device 40B comprises a single unit, which provides for improved ease of operation and endurance for measurement device 40B. For example, the single unit enables user 16 (FIG. 3) to use measurement device 40B using a single hand. In this manner, user 16 can use his/her other hand for balance, to hold additional equipment, and/or the like. Further, the lack of a connection to a second unit eliminates potential breakage points of measurement device 40B (e.g., broken connection, inlets for water or dirt, etc.). Still further, the various components of measurement device 40B can operate in an integrated manner, which provides reduced power demands over previous measurement devices.

In an event, measurement device 40A-C can comprise a rugged exterior casing that is designed to withstand the rigors of use in a train yard. To this extent, the casing can include attachment points for a holster, lanyards, straps, and/or the like, for carrying measurement device 40A-C. Additionally, the casing can include safety grips to assist in the safe and accurate placement of measurement device 40A-C on a railway wheel. Further, the casing can include protection for sensors and other electronics, such as protective windows and/or coatings for contact and/or near contact sensors. For example, an artificial colorless sapphire window can be included to cover a display unit, light sensor, light emitter, and/or the like. Use of the sapphire window provides a hard and durable solution for protecting against a substantial amount of abuse, while permitting the transmission of light. Other alternatives, such as crystallized carbon (diamond) can be incorporated in measurement device 40A-C to protect such components.

Preventing measurement device 40A-C from being harmed in various weather conditions can be important when it is used in a train yard environment. To this extent, the casing can be sealed along multiple points (e.g., using screws, clamping mechanisms, and/or the like) with a gasket to help ensure protection from external elements at all locations of the casing. However, in order to perform maintenance on measurement device 40A-C, the casing may need to be opened and resealed. To this extent, the casing can be sealed using helicoil screw points, which can increase the durability and simplify repair over the use of standard screws. Helicoil screw points are manufactured by boring an initial hole in a softer substance (e.g., aluminum) and inserting a coiled wire into the hole. The coiled wire provides more durable threads for the screw/bolt that is inserted.

It is understood that numerous alternatives to measurement devices 40A-C are possible under various embodiments of the invention. To this extent, one or more of the features shown for one of measurement devices 40A-C can be included in the other of measurement devices 40A-C. In an embodiment of the invention, the measurement device includes a personal computing device, such as a personal data assistant (PDA), in communications with a sensor head as shown and described in the co-owned, co-pending U.S. utility patent application Ser. No. 11/136,207, filed on 24 May 2005, and entitled "Inspection Method, System, and Program Product", which is hereby incorporated herein by reference. In this case, the sensor head, which can be configured similar to measurement device 40B, can communicate with the personal computing device using a wireless communications link or the like, and some or all of the processing of the measurement data obtained by the sensor head can be performed on the personal computing device rather than on the sensor head. In any event, further details of the invention will be shown and described with reference to measurement device 40B as an illustrative device configuration.

B. Placement Features

Figure 5B:
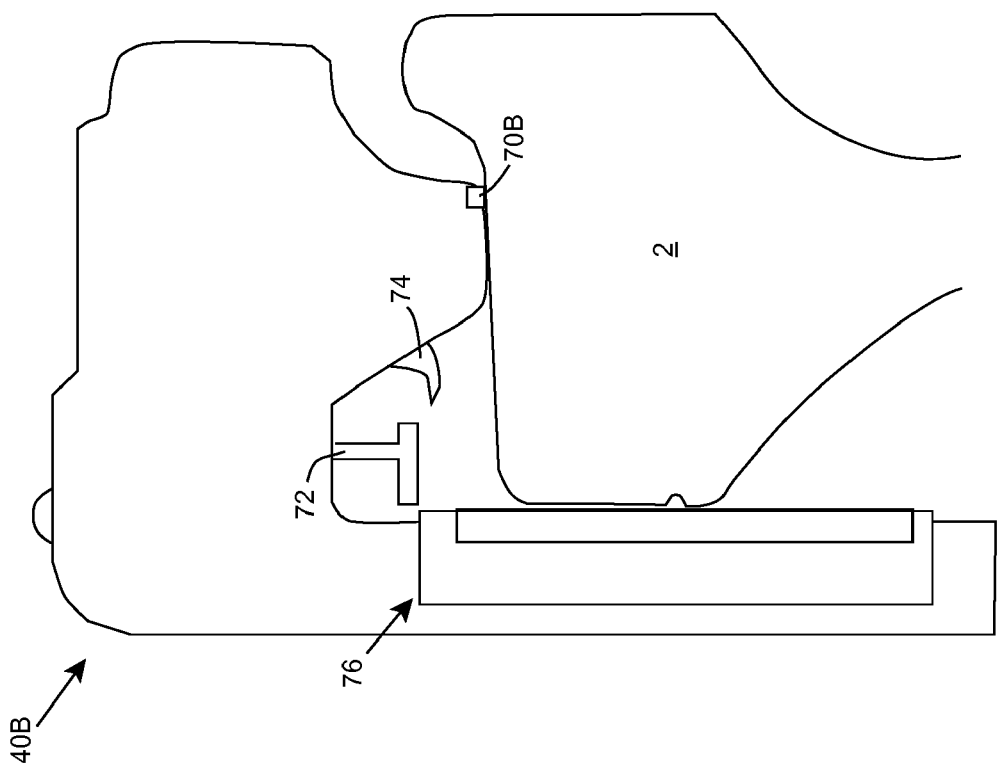
FIGS. 5A-B show an illustrative measurement device placed to measure a gauge side and a field side of a railway wheel, respectively, according to an embodiment of the invention.
Figure 5A:
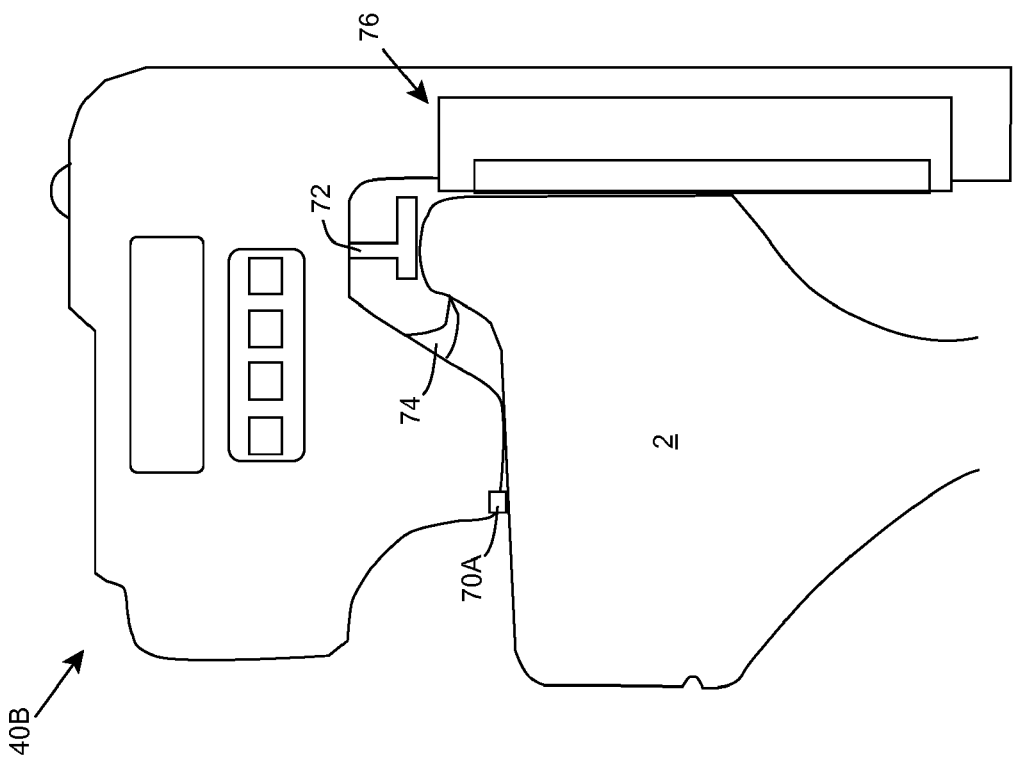

Acquisition module 44 (FIG. 3) can include a set of placement sensors that can detect when measurement device 40B, and therefore a set of sensing devices of measurement device 40B, is correctly aligned with a railway wheel for obtaining measurements of the railway wheel. FIGS. 5A-B show measurement device 40B placed to measure a gauge side and a field side of railway wheel 2, respectively, according to an embodiment of the invention. As illustrated, measurement device 40B includes a pair of non-adjusting front contact sensors 70A-B, each of which activates when in contact with railway wheel 2. Acquisition module 44 can determine whether measurement device 40B is correctly aligned with railway wheel 2 for measurement based on the activation status of sensors 70A-B.

For example, when neither sensor 70A-B is active, acquisition module 44 (FIG. 3) can determine that measurement device 40B is not properly located for measurement and disable the acquisition of measurement data. Further, acquisition module 44 can determine when one sensor 70A-B is active and the other is not active. In this case, interface module 42 can notify user 16 (FIG. 3), e.g., aurally, visually, or the like, that measurement device 40B is tilted to one side. To this extent, acquisition module 44 can determine which sensor 70A-B is inactive, and interface module 42 can notify user 16 of the correct action to take (e.g., tilt left/right). Interface module 42 also can notify user 16 when sensors 70A-B indicate that measurement device 40B is correctly aligned with railway wheel 2.

C. Acquisition Features

Regardless, when properly placed, acquisition module 44 (FIG. 3) can measure railway wheel 2. For example, user 16 (FIG. 3) can initiate the measurement using any solution. Alternatively, acquisition module 44 can automatically measure railway wheel 2 and interface module 42 can inform user 16 when the measurement is complete. The manner in which the measurement is initiated can be selected by user 16. Further, user 16 can select to override the determination of an improper position of measurement device 40B and obtain measurements regardless of the status of sensors 70A-B (e.g., when one or both of sensors 70A-B are not properly functioning).

1. Illustrative Measurement Components

Acquisition module 44 (FIG. 3) includes a set of sensors for obtaining measurements of an object, such as railway wheel 2. To this extent, when measurement is desired, acquisition module 44 can obtain data from each of the set of sensors and store the data as wheel data 60 (FIG. 3) for railway wheel 2. The set of sensors can comprise numerous disparate types of sensors, a single type of sensor, or the like. For measuring a railway wheel, the set of sensors can include a flange height sensor 72, a flange thickness sensor 74, and a rim thickness sensor 76.

Figure 1B:
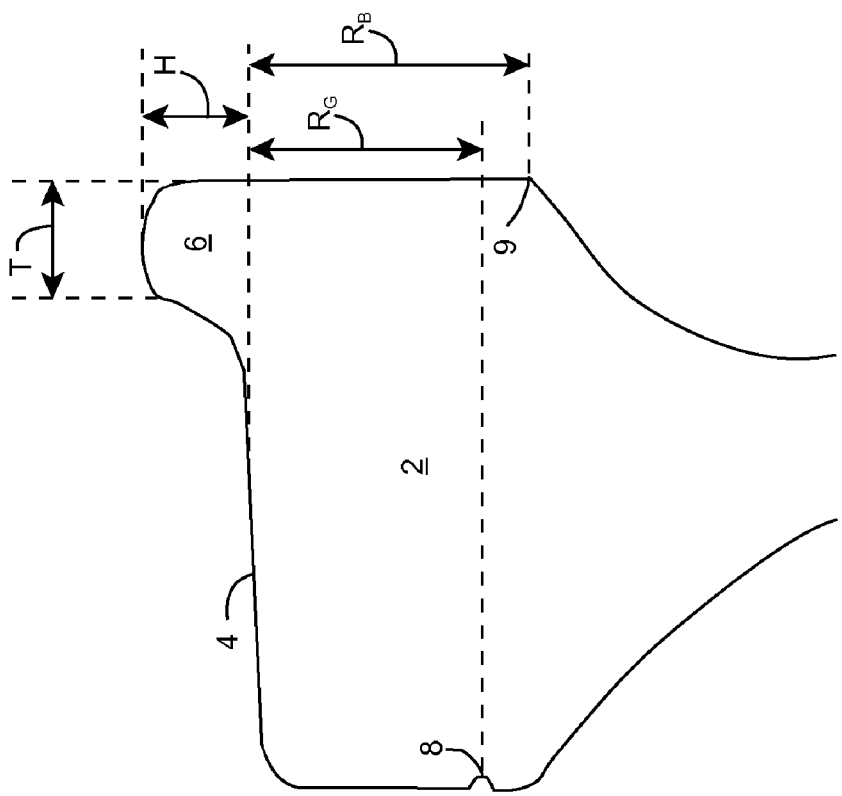

In an embodiment of the invention, measurement device 40B is placed on railway wheel 2 in two positions that enable acquisition module 44 (FIG. 3) to obtain a complete set of measurements for railway wheel 2. In particular, as shown in FIG. 5A, measurement device 40B is placed such that rim thickness sensor 76 is on a gauge side of railway wheel 2. In this placement, flange height sensor 72 can measure flange height H (FIG. 1A), flange thickness sensor 74 can measure a flange thickness T (FIG. 1A), and rim thickness sensor 76 can measure a rim thickness $R_B$ (FIG. 1A). Additionally, as shown in FIG. 5B, measurement device 40B is placed such that rim thickness sensor 76 is on a field side of railway wheel 2. In this placement, rim thickness sensor 76 can measure a rim thickness $R_G$ (FIG. 1A).

Figure 6C:
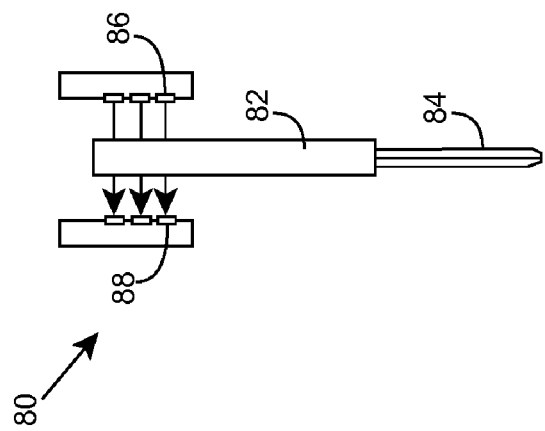
FIGS. 6A-C show various views of an illustrative prior art absolute position rotational sensor.
Figure 6B:
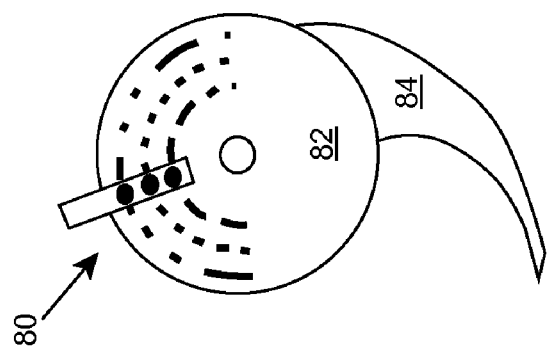
Figure 6A:
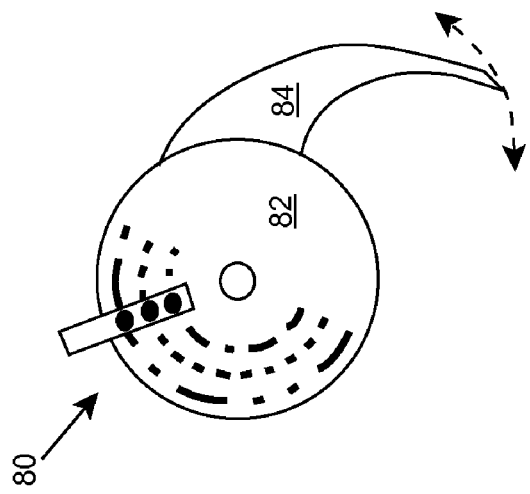

Flange thickness sensor 74 can be implemented using any solution. For example, FIGS. 6A-C show various views of an illustrative prior art absolute position rotational sensor 80. Rotational sensor 80 includes a wheel 82 and a finger 84. In operation, finger 84 contacts flange 6 (FIG. 1A), causing wheel 82 to turn. Wheel 82 includes a plurality of positional tracks, which include openings that generate a unique pattern based on a position of finger 84. For each positional track, rotational sensor 80 includes a light emitter 86 and a corresponding light sensor 88. A position of finger 84, and therefore a thickness of flange 6, can be determined by the pattern detected by sensors 88. In an embodiment of the invention, the positional tracks on wheel 82 form a magnetic pattern and rotational sensor 80 includes only a set of magnetic sensors. In this case, the light emitters 86 and light sensors 88 are not required, thereby reducing the operating requirements for rotational sensor 80.

Rotational sensor 80 requires substantial design and precise manufacturing to ensure that no duplicate sequences are included in the positional tracks. Further, a large number of positional tracks may be required to provide a sufficient measurement accuracy. To this extent, an embodiment of the invention uses one or more incremental position encoders rather than the prior art absolute position encoders. In general, an incremental position encoder is easier to design and construct. An incremental position encoder includes a single positional track having evenly spaced openings/pattern that provides a desired resolution.

Figure 7C:
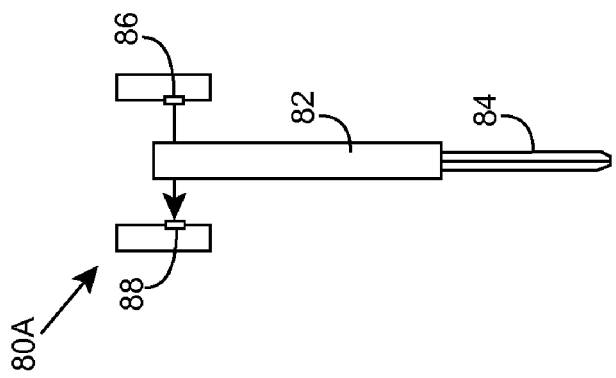
FIGS. 7A-C show various views of an illustrative incremental position rotational sensor according to an embodiment of the invention.
Figure 7B:
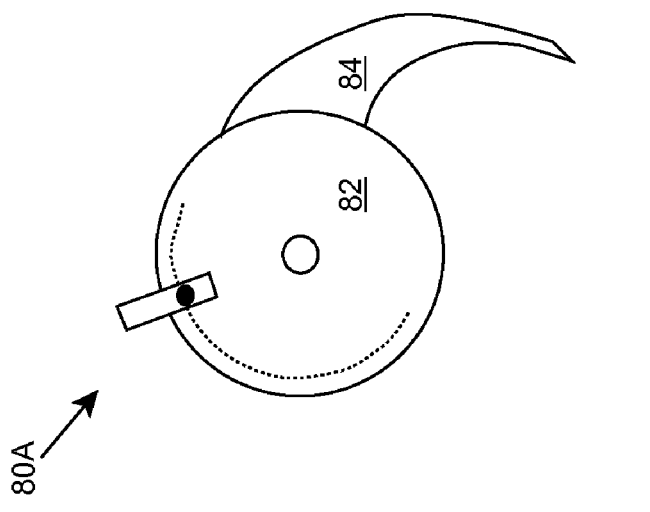
Figure 7A:
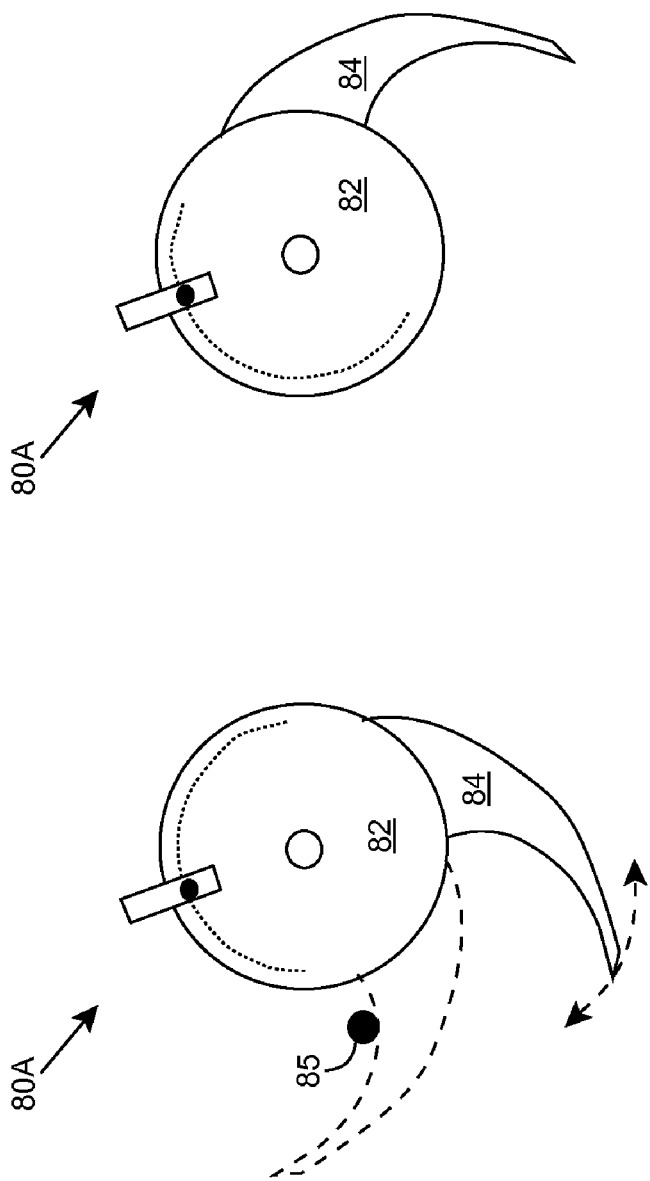

FIGS. 7A-C show various views of an illustrative incremental position rotational sensor 80A, which can be used as a flange thickness sensor 74 (FIG. 5A) according to an embodiment of the invention. Rotational sensor 80A includes a single positional track, which includes a regular pattern of spacing that permits a resolution of a rotational position of rotational sensor 80A to any desired level. In operation, rotational sensor 80A includes a stop sensor 85 that detects when wheel 82/finger 84 are in a fully extended state (e.g., finger 84 is not contacting any object). When stop sensor 85 is activated, a counter is set to zero. Subsequently, as finger 84 and wheel 82 move due to contact with an object, such as flange 6 (FIG. 1A), rotational sensor 80A counts a number of openings that pass between emitter 86 and sensor 88. In order to maintain an accurate count, rotational sensor 80A can detect a direction of movement of finger 84 and wheel 82. In this manner, rotational sensor 80A can subtract from the number of openings when finger 84 is moving toward stop sensor 85, and add to the number of openings when finger 84 is moving away from stop sensor 85. It is understood that incremental position rotational sensor 80A can be implemented without an emitter 86, e.g., when sensor 88 comprises a magnetic sensor.

Returning to FIGS. 5A-B, flange thickness sensor 74 can comprise an absolute position rotational sensor 80 (FIG. 6A) or an incremental position rotational sensor 80A (FIG. 7A). Similarly, flange height sensor 72 can be implemented using an absolute position rotational sensor 80 or an incremental position rotational sensor 80A. Alternatively, flange height sensor 72 and/or flange thickness sensor 74 can comprise an absolute/incremental position linear sensor. For example, FIGS. 8A-B show two views of an illustrative incremental position linear sensor 90 according to an embodiment of the invention. Linear sensor 90 includes a shaft 92, which is mounted on a plunger 94 (e.g., piston, slide, gears, or the like), for moving shaft 92 into/out from a housing 91. In this embodiment, shaft 92 includes a positional track, which includes openings that pass through emitter 96 and sensor 98. Sensor 98 maintains a count of the number of openings that have passed based on the sensed light generated by emitter 96 and a direction of movement of shaft 92. Linear sensor 90 also can include a stop sensor as discussed with respect to incremental position rotational sensor 80A (FIG. 7A).

When not in operation, shaft 92 can be normally extended beyond housing 91 or contained within housing 91. In the former case, shaft 92 will move in toward housing 91 upon contact with an object causing sensor 98 to increment a counter for each opening that passes thereby. Additionally, a stop sensor can be placed to detect when shaft 92 is in the fully extended position. In the latter case, to obtain a measurement, plunger 94 can move shaft 92 out from housing 91 until shaft 92 contacts an object. In this case, a stop sensor can be placed to detect when shaft 92 is in the fully retracted position. It is understood that various alternative configurations of incremental position linear sensor 90 are possible. For example, FIGS. 9A-B show two views of an alternative incremental position linear sensor 90A according to an embodiment of the invention. In this case, shaft 92 includes a flange 93, which comprises a positional track that is sensed by sensor 98 as shaft 92 and flange 93 move into/out of housing 91. Additionally, it is understood that either linear sensor 90, 90A could be configured with a plurality of position tracks for encoding an absolute position of shaft 92.

Returning to FIGS. 5A-B, rim thickness sensor 76 can comprise a sufficient length to measure a rim thickness $R_G$, $R_B$ for any type of railway wheel 2. In particular, rim thickness sensor 76 can extend to a location that is below reference groove 8 (FIG. 1A) and/or rim break point 9 (FIG. 1A) of a railway wheel 2 having the largest rim thickness $R_G$, $R_B$. In this manner, acquisition module 44 (FIG. 3) can measure all types of railway wheels 2. Alternatively, rim thickness sensor 76 can be configured to measure a subset of possible railway wheels 2, which can enable rim thickness sensor 76 to be smaller, thereby requiring less operational power and less space.

Rim thickness sensor 76 can measure rim thicknesses $R_G$, $R_B$ (FIG. 1A) using any solution. For example, rim thickness sensor 76 can comprise an array of sensors that function on the eddy current principle. Alternatively, rim thickness sensor 76 can comprise an array of sensors that function based on the Hall Effect. The Hall Effect permits the detection and measurement of a metallic object based on its effect on a biasing magnetic field within a relatively wide range of distance from the metallic object. To this extent, use of such an array of sensors can enable them to be covered with a thicker protective covering than possible with eddy current principle-based sensors, which can extend the durability and operability of the sensor array. Further, currently available Hall Effect sensors that are relatively inexpensive and rugged can be incorporated as rim thickness sensor 76.

FIGS. 10A-B show two views of an illustrative rim thickness sensor 76 that functions based on the Hall Effect according to an embodiment of the invention. Rim thickness sensor 76 includes an array of Hall Effect sensors, such as Hall Effect sensors 100A-B, which are placed in a pair of staggered rows along a top surface of a ferrite core 102. Core 102 is wound with a conductive wire, such as copper, to produce a coil 104. When acquisition module 44 (FIG. 3) supplies an electrical current to coil 104, a magnetic field 106 is produced, which is vertically oriented with respect to sensors 100A-B. A current through Hall Effect sensors 100A-B will vary based on an amount of metal in close proximity to sensors 100A-B.

FIG. 11 shows a rim thickness sensor 76 placed in two illustrative measurement locations on a railway wheel 2 and the resulting measurement graphs 110A-B generated by rim thickness sensor 76 for each measurement location according to an embodiment of the invention. As illustrated, points $P_{1-6}$ can be readily detected using the two measurement locations and the resulting measurement graphs 110A-B. Using some or all of points $P_{1-6}$, rim thicknesses $R_G$ and $R_B$ can be calculated using any solution.

It is understood that the measurements and the sensors described herein are only illustrative of various measurements/sensors that can be obtained by/incorporated into acquisition module 44 (FIG. 3). For example, acquisition module 44 can use radiation, such as laser triangulation as shown and described in the co-owned, co-pending U.S. utility patent application Ser. No. 11/134,944, filed on 23 May 2005, and entitled "Portable Electronic Measurement", which is hereby incorporated herein by reference, to obtain one or more measurements of railway wheel 2 (FIG. 5A). Further, acquisition module 44 can use an electromagnetic acoustic transduction approach, such as that shown and described in U.S. Pat. No. 6,523,411, which is hereby incorporated herein by reference. In this case, acquisition module 44 can direct a surface wave towards railway wheel 2 (FIG. 5A) and can sense the reflection of the surface wave. To this extent, acquisition module 44 can obtain additional measurements. For example, a middle of a wheel tread of a transit wheel may be interrogated (using, for example, shear vertical waves in pulse-echo mode) to return a tread thickness for the transit wheel. Since transit wheel inner diameters are well defined, this provides both a surface for returning the tread thickness signal, and a known dimension to which the tread thickness may be added in order to arrive at an accurate diameter estimate.

Additionally, acquisition module 44 (FIG. 3) can include sufficient sensors to obtain all desired measurements of a railway wheel 2 (FIG. 5A) in a single placement. To this extent, FIG. 12 shows an illustrative measurement device 40D according to an embodiment of the invention. Measurement device 40D includes two rim thickness sensors 76A-B, which can obtain measurements for the rim thickness on both the gauge side and field side of railway wheel 2. Further, measurement device 40D can include a flange thickness sensor 74, flange height sensor 72, and contact sensor(s) 70A, which can operate as shown and described herein.

2. Measurement Evaluation and Modal Operation

FIG. 15 shows an illustrative process for inspecting a set of wheels according to an embodiment of the invention, which can be implemented on measurement device 40. Referring to FIGS. 3 and 15, in general, mode module 48 can manage a plurality of operating modes for measurement device 40. For example, mode module 48 can set measurement device 40 to a normal mode of operation, during which the set of wheels are measured. In particular, during a normal measurement mode, mode module 48 can manage an inspection schedule for a train. The inspection schedule can include the number of vehicles to be inspected as well as the wheels for each vehicle. In this case, mode module 48 can prompt user 16 to place measurement device 40 on a particular wheel of a vehicle and obtain the measurements. When required, measurement device 40 can be placed on the wheel in multiple locations (e.g., field side and gauge side of a railway wheel). Mode module 48 can prompt to obtain measurements for the railway wheels of a vehicle/train in any desired order.

Regardless, as part of the inspection schedule, in process M1, acquisition module 44 obtains a set of measurements for a railway wheel and stores the measurements on measurement device 40. Measurement device 40 can include an evaluation module 46 that, in process M2, evaluates some or all of the set of measurements. For example, evaluation module 46 can determine an operability of the wheel. In particular, evaluation module 46 can determine whether the wheel remains within safe operating limits. If not, evaluation module 46 can calculate the requirements for retruing the wheel (e.g., by subtracting the flange thickness from the rim thickness value) to determine if the wheel can be retrued. If it is possible, evaluation module 46 can calculate a set of more precise retruing values and flag the wheel for retruing. If it is not possible, evaluation module 46 can flag the wheel for condemnation.

Further, evaluation module 46 can evaluate some or all of the set of measurements with one or more anticipated wheel properties to determine a validity of the evaluated measurement(s). For example, user 16 and/or scheduling module 32 can indicate a type/model of wheel being measured. Evaluation module 46 can use a set of maximum measurements to compare with the obtained measurements and ensure that the obtained measurements are within the maximum measurements. Similarly, evaluation module 46 can use a minimum measurement for one or more measurements and ensure that the measurement is above the minimum measurement.

To this extent, evaluation module 46 can obtain a set of previous measurements for the railway wheel. For example, history module 34 can obtain wheel data 60 based on a train scheduled to be inspected and provide the measurement history for one or more railway wheels on the train for use by evaluation module 46. After a railway wheel is measured, evaluation module 46 can compare the set of measurements to the set of previous measurements to determine whether any anomalies are present in the measurements. For example, the new set of measurements may indicate that the railway wheel has "grown" since the previous measurement, an impossibility. Further, the measurement may indicate wear that is below/beyond and expected range of wear.

There are several potential sources of anomalies in the set of measurements. For example, measurement device 40 may have been incorrectly placed on the wheel when acquisition module 44 obtained the measurements, one or more sensors in acquisition module 44 may have malfunctioned, and/or the like. Similarly, the set of previous measurements may be inaccurate. Additionally, a different railway wheel may have been measured.

In any event, in decision M3, mode module 48 determines whether evaluation module 46 detected an anomaly in the set of measurements. If so, mode module 48 can change a measurement mode for measurement device 40 to a re-measure mode and attempt to rectify the anomaly. To this extent, mode module 48 can request that user 16 re-measure the particular wheel in process M1. Should evaluation module 46 again identify one or more anomalies, mode module 48 can request that user 16 re-measure the wheel in one or more different locations. In this manner, mode module 48 can determine if a local defect may be present in the previous measurement location. Should evaluation module 46 again identify one or more anomalies, mode module 48 can request that user 16 identify the wheel (e.g., location on the vehicle, type in the serial number, and/or the like) to ensure that the correct measurements are being compared. If the wheel measurements are for the same wheel, mode module 48 can store the measurement data, flag the wheel for subsequent follow up, and return to the normal measurement mode.

Additionally, when preliminary measurement data is available, scheduling module 32 can identify one or more wheels that may have a local defect, such as a flat spot, as a suspect wheel, which can be communicated to measurement device 40 (e.g., together with wheel data 60). In this case, during the normal measurement mode, in decision M4, mode module 48 can determine whether the wheel is a suspect wheel. If so, then mode module 48 can temporarily switch to a follow up mode. To this extent, in process M5, mode module 48 can request that user 16 perform some follow up evaluation/measurement of the wheel. For example, if the preliminary measurement data indicates that a flat spot may be present, user 16 can be prompted to obtain measurement data for the center of the flat spot. Subsequently, evaluation module 46 can determine a depth of the flat spot based on, for example, a difference between the flange heights measured in the center of the flat spot and in another location on the wheel. Similarly, evaluation module 46 can calculate a lateral extent of the flat spot based on its measured depth. In an embodiment, acquisition module 44 can measure the flange height to an accuracy of less than five mils. In this case, evaluation module 46 can measure a flat spot less than one inch in diameter.

Additionally, evaluation module 46 can evaluate a related set of wheels. For example, in decision M6, evaluation module 46 can determine if both wheels of an axle have been measured. If so, in process M7, evaluation module 46 can evaluate an operability of the axle. For example, evaluation module 46 can determine whether the wheel diameters are within safe tolerances (e.g., a difference in the diameters is sufficiently small). If not, then evaluation module 46 can flag the axle for follow up action. In particular, one or both wheels can be replaced with wheels having sufficiently close diameters. Similarly, evaluation module 46 can evaluate an operability of a vehicle. For example, evaluation module 46 can determine if any reprofiling is required to restore an ideal profile for the particular vehicle (e.g., a wheel truck for a railway car). In this case, after all wheels on the vehicle have been measured, evaluation module 46 can compare the measurements for all of the wheels noting that the smallest diameter wheel will provide the limiting dimensions on the set of wheels. In any event, in decision M8, mode module 48 determines whether any additional wheels require measurement, and if so, the process returns to process M1.

Mode module 48 can implement various other operating modes. For example, mode module 48 can manage a setup mode during which history module 34 provides wheel data 60 to measurement device 40, a synchronize mode during which interface module 42 uploads the measurement data to data module 36, and/or the like. Further, mode module 48 can place measurement device 40 into a sleep mode when measurement device 40 has not obtained measurements for a period of time and/or been used by user 16 or another module. In this case, some or all of the various emitters/sensors of acquisition module 44 and/or the various interface devices of interface module 42 (e.g., wireless communications interface) can be powered off or switched to a low power mode to conserve power. Still further, mode module 48 can manage a configuration mode during which dynamic support system 52 updates one or more features of measurement device 40.

D. Interface Features

Interface module 42 can include various I/O devices that enable measurement device 40 to interact with user 16, dynamic support system 52, and wheel management program 30. In an embodiment, measurement device 40 comprises a handheld measurement device and interface module 42 communicates with computing device 14 and/or dynamic support system 52 using any type of wireless communications link. In this case, measurement device 40 can be carried by user 16 while he/she inspects wheels, such as those of vehicles on a train. Use of a wireless communications link between wheel management program 30 and measurement device 40 reduces a number of potential breakage points for measurement device 40. Additionally, wireless communications enable the dynamic sharing of data between the two systems. For example, evaluation module 46 can send measurement data and the subsequent evaluation results (e.g., maintenance recommendations, such as retruing) for processing by data module 36 immediately after a wheel/axle/vehicle has been measured and without interrupting field operations. Similarly, history module 34 can provide preliminary measurement data and/or previous measurement data for use on measurement device 40 while user 16 is inspecting the wheels (e.g., in a just in time fashion). In this manner, measurement device 40 does not need to store all the data in advance of inspecting the wheels.

Additionally, interface module 42 can include an improved interface for user 16. To this extent, FIG. 13 shows a more detailed view of an illustrative group of interface devices for a measurement device 40 according to an embodiment of the invention. Referring to FIGS. 3 and 13, interface module 42 can include a graphical user interface 120, which can display a combination of text and graphics for user 16. Graphical user interface 120 enables interface module 42 to display a graphical representation of the inspection process. For example, as shown, graphical user interface 120 can display a representation of one or more vehicles (e.g., cars, engines, etc.) and their corresponding wheels. Different colors, patterns, and/or the like can be used to display status information for a vehicle/axle/wheel. For example, the status information can include a required follow up action (e.g., retruing, replacement, re-measurement) for a vehicle/axle/wheel, a vehicle/wheel currently being inspected, an uninspected/inspected status for a wheel/vehicle, a suspect wheel, and/or the like. Additionally, graphical user interface 120 can include text that provides some or all of this information. In this manner, user 16 can more efficiently and confidently perform the inspection.

Graphical user interface 120 also can enable the selection of various functions and/or input of data using a menu or the like. To this extent, interface module 42 can include a set of user interface controls. The user interface controls can comprise a relatively simple keypad 122, which includes a reduced set of input keys (e.g., four) that can be operated with one hand. Keypad 122 can enable user 16 to scroll through the menu and make a selection. Further, interface module 42 can include a trigger 124, which user 16 can use to obtain measurements for a wheel. Trigger 124 can be located anywhere on measurement device 40 so that it is readily accessible when measurement device 40 is in a measurement position for a wheel. Additionally, trigger 124 can be used in conjunction with keypad 122 to make menu selections and the like, e.g., with keypad 122 being used to scroll to different options and trigger 124 to make the selection.

Interface module 42 also can include other interfaces. For example, interface module 42 can include a light emitter 126 (e.g., a light emitting diode (LED), miniature bulb, or the like), which can shine/flash when attention is required from user 16. Similarly, a speaker 128 can be included to provide audio feedback (e.g., on the placement of measurement device 40, failed reading, or the like), audio instructions, alarm sounds, and/or the like. Still further, interface module 42 can include a vibration unit 130, which can vibrate to obtain the attention of user 16. Vibration unit 130 can operate using any solution, such as a low-power off-axis unit, an electromagnetic unit, a piezoelectric unit, and/or the like.

In any event, interface module 42 and dynamic support system 52 can enable user 16 to make various customizations to the operation of interface module 42. For example, user 16 can alter one or more aspects of the content of graphical user interface 120, such as a language, a point size, etc., of text, a color and/or pattern scheme, and/or the like. Further, user 16 can customize how interface module 42 presents information, e.g., vibration, visual, audio, and/or light. Still further, user 16 can use interface module 42 to make one or more customizations to an inspection schedule, such as an order of inspection for the wheels of a vehicle, vehicles in the train, or the like.

E. Self-Health Features

Measurement device 40 also can include a self-health module 49, which monitors an operability of measurement device 40. For example, measurement device 40 can include a power system that includes a set of integrated battery packs that are modular and removable, batteries that can be recharged without removal (thereby eliminating a potential breakage point) using an inductive charging system, and/or the like. Regardless, self-health module 49 can track power usage and determine an amount of available power from the power system before a recharge will be required. The amount of available power can be displayed to user 16 as a fuel gauge (as shown in FIG. 13), as a number of minutes, as a number of wheel measurements, and/or the like.

Additionally, self-health module 49 can include a set of internal and/or external sensors 132 (FIG. 13) that can measure various operational environment attributes of measurement device 40. For example, the set of sensors 132 can include one or more sensors for measuring a drop, a shock, a high speed impact, vibration, a temperature extreme, internal moisture, and/or the like, which can be monitored and evaluated by self-health module 49. Upon the detection of an abnormal event (e.g., measured value is beyond an acceptable range) or a series of abnormal events, self-health module 49 can perform one or more actions, such as perform a self-diagnostic test of one or more of the modules (e.g., measurement sensors), shut down one or more of the modules, notify user 16, communicate a status for processing by wheel management program 30, and/or the like. In this manner, self-health module 49 can detect a pattern of use and/or abuse, which may lead/have led to a failure of one or more modules of measurement device 40. Still further, self-health module 49 can periodically provide the monitored data for processing on dynamic support system 52, which can maintain a history of the various operational environment attributes to which the particular measurement device 40 has been subjected.

Further, self-health module 49 can manage a calibration schedule that requires one or more of the sensors to be periodically checked for accuracy and any required adjustments performed. To this extent, self-health module 49 can monitor one or more return to zero sensors or the like to ensure that a sensor has fully extended/retracted after being used to obtain a measurement. In the event that the return to zero sensor does not activate, self-health module 49 can notify user 16 prior to another measurement being performed. User 16 can attempt to take corrective action, stop use of measurement device 40, and/or the like.

IV. Alternatives

While shown and described herein as a method and system for managing railway wheels and train inspections, it is understood that the invention further provides various alternative embodiments. For example, in one embodiment, the invention provides a computer program stored on a computer-readable medium, which when executed, enables a computer system to manage a set of railway wheels and/or perform a train inspection. To this extent, the computer-readable medium includes program code, such as wheel management program 30 (FIG. 3), which implements the process described herein. It is understood that the term "computer-readable medium" comprises one or more of any type of tangible medium of expression (e.g., physical embodiment) of the program code. In particular, the computer-readable medium can comprise program code embodied on one or more portable storage articles of manufacture, on one or more data storage portions of a computing device, such as memory 22A (FIG. 3) and/or storage system 22B (FIG. 3), as a data signal traveling over a network (e.g., during a wired/wireless electronic distribution of the computer program), on paper (e.g., capable of being scanned and converted to electronic data), and/or the like.

In another embodiment, the invention provides a method of generating a system for managing railway wheels and train inspections. In this case, a computer system, such as computer system 12 (FIG. 3), can be obtained (e.g., created, maintained, having made available to, etc.) and one or more programs/systems for performing the process described herein can be obtained (e.g., created, purchased, used, modified, etc.) and deployed to the computer system. To this extent, the deployment can comprise one or more of: (1) installing program code on a computing device, such as computing device 14 (FIG. 3), from a computer-readable medium; (2) adding one or more computing devices to the computer system; and (3) incorporating and/or modifying one or more existing devices of the computer system, to enable the computer system to perform the process described herein.

In still another embodiment, the invention provides a business method that performs the process described herein on a subscription, advertising, and/or fee basis. That is, a service provider could offer to manage railway wheels and train inspections as described herein. In this case, the service provider can manage (e.g., create, maintain, support, etc.) a computer system, such as computer system 12 (FIG. 3), that performs the process described herein for one or more customers. In return, the service provider can receive payment from the customer(s) under a subscription and/or fee agreement, receive payment from the sale of advertising to one or more third parties, and/or the like.

As used herein, it is understood that "program code" means any expression, in any language, code or notation, of a set of instructions that cause a computing device having an information processing capability to perform a particular function either directly or after any combination of the following: (a) conversion to another language, code or notation; (b) reproduction in a different material form; and/or (c) decompression. To this extent, program code can be embodied as some or all of one or more types of computer programs, such as an application/software program, component software/a library of functions, an operating system, a basic I/O system/driver for a particular computing, storage and/or I/O device, and the like.

The foregoing description of various aspects of the invention has been presented for purposes of illustration and description. It is not intended to be exhaustive or to limit the invention to the precise form disclosed, and obviously, many modifications and variations are possible. Such modifications and variations that may be apparent to an individual in the art are included within the scope of the invention as defined by the accompanying claims.

What is claimed is:

1. A handheld measurement device comprising:
   a system for obtaining a plurality of measurements for a wheel, wherein the system for obtaining includes a system for detecting when a set of sensing devices are correctly aligned with the wheel; and
   a system for evaluating at least one of the plurality of measurements with at least one anticipated wheel property to determine a validity of the at least one of the plurality of measurements.

2. The device of claim 1, further comprising a system for requesting a re-measurement of the wheel based on the evaluating.

3. The device of claim 1, wherein the system for evaluating includes:
   a system for obtaining a set of previous measurements for the wheel; and
   a system for comparing the set of previous measurements with at least one of the plurality of measurements.

4. The device of claim 1, wherein the system for obtaining includes at least one linear sensor.

5. The device of claim 1, wherein one of the set of sensing devices is a sensor array.

6. The device of claim 1, further comprising:
a graphical user interface configured to display at least one of: an operating status of the system for obtaining, a representation of the wheel, or the validity of the at least one of the plurality of measurements; and
a set of user interface controls configured to enable a user to select fUnctions for at least one of: the graphical user interface or the system for obtaining 7. The device of claim 6, further comprising a system for graphically displaying on the graphical user interface a status of at least one of: a wheel, an axle, a car, or an engine.

8. The device of claim 1, further comprising:
a system for managing an inspection schedule for a train, wherein a user obtains the plurality of measurements for each of a plurality of wheels on the train according to the inspection schedule; and
a system for managing a plurality of measurement modes, the plurality of measurement modes including a mode for performing measurements according to the inspection schedule and a mode for re-measuring a wheel.

9. The device of claim 1, further comprising a system for monitoring an operability of the device.

10. The device of claim 1, further comprising a wireless communications system in communications with at least one of the system for obtaining or the system for evaluating, the wireless communications system configured to wirelessly communicate with at least one of: a wheel management system or a dynamic support system.

* * * * *